(12) United States Patent
Hsu et al.

(10) Patent No.: US 6,333,598 B1
(45) Date of Patent: Dec. 25, 2001

(54) LOW GATE CURRENT FIELD EMITTER CELL AND ARRAY WITH VERTICAL THIN-FILM-EDGE EMITTER

(75) Inventors: David S. Y. Hsu, Alexandria; Henry F. Gray, deceased, late of Alexandria, both of VA (US), by Joan G. Gray; executor; by James R. Gray, executor, New York, NY (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/478,899

(22) Filed: Jan. 7, 2000

(Under 37 CFR 1.47)

(51) Int. Cl.[7] .................................................. H01J 1/62
(52) U.S. Cl. ........................ 313/495; 313/309; 313/310; 313/336; 313/351; 257/10
(58) Field of Search ................................. 313/309, 310, 313/336, 351, 355, 495; 257/10, 11

(56) References Cited

U.S. PATENT DOCUMENTS

| | | | |
|---|---|---|---|
| 5,170,092 | 12/1992 | Tomii et al. | 313/310 |
| 5,214,347 | 5/1993 | Gray | 313/355 |
| 5,246,879 | 9/1993 | Hsu et al. | 437/180 |
| 5,266,155 | 11/1993 | Gray | 156/651 |
| 5,382,185 | 1/1995 | Gray et al. | 445/48 |
| 5,457,355 | 10/1995 | Fleming et al. | 313/336 |
| 5,584,740 | 12/1996 | Hsu et al. | 445/49 |
| 5,587,588 | 12/1996 | Kim | 257/10 |
| 5,769,679 | 6/1998 | Park et al. | 445/50 |
| 5,780,318 | 7/1998 | Hirano et al. | 438/20 |
| 5,864,147 | 1/1999 | Konuma | 257/10 |
| 5,910,701 | 6/1999 | Takemura | 313/309 |

OTHER PUBLICATIONS

Fleming, J.G., et al. "Fabrication and Testing of Vertical Metal Edge Emitters with Well Defined Gate to Emitter Separation," *J. Vac. Sci. Technol.*, B14(3), May/Jun. 1996, pp. 1958–1962.

Hsu et al., "Conformal Chemical Beam Deposition of Thin Metal Film for Fabricating High Density Trench Capacitor Cells," *Appl. Phys. Lett.*, 63(2), Jul. 12, 1993, pp. 159–161.

Chou, et al., "Imprint Lithography with 25–Nanometer Resoultion," *Science*, vol. 272, Apr. 5, 1996, pp. 85–87.

*Primary Examiner*—Michael H. Day
*Assistant Examiner*—Joseph Williams
(74) *Attorney, Agent, or Firm*—John J. Krarasek; Stephen t. Hunnius

(57) ABSTRACT

A field emitter cell includes a thin-film-edge emitter normal to the gate layer. The field emitter cell may include a conductive substrate layer, an insulator layer having a perforation, a gate layer having a perforation, an emitter layer, and other optional layers. The perforation in the gate layer is larger and concentrically offset with respect to the perforation in the insulating layer and may be of a tapered construction. Alternatively, the perforation in the gate layer may be coincident with, or larger or smaller than, the perforation in the insulating layer, provided that the gate layer is shielded from the emitter from a direct line-of-sight by a nonconducting standoff layer. Optionally, the thin-film-edge emitter may include incorporated nanofilaments. The field emitter cell has low gate current, making it useful for various applications such as field emitter displays, high voltage power switching, microwave, RF amplification and other applications that require high emission currents.

33 Claims, 18 Drawing Sheets

LOW GATE CURRENT FIELD EMITTER CELL AND ARRAY WITH VERTICAL THIN-FILM-EDGE EMITTER

BACKGROUND OF THE INVENTION

1. Field of the Invention

The present invention relates generally to field emitter cells and arrays. More specifically, the present invention relates to low gate current thin-film-edge emitter cells and arrays.

2. Description of the Background Art

Very small localized vacuum electron sources which emit sufficiently high currents for practical applications are difficult to fabricate. This is particularly true when the sources are required to operate at reasonably low voltages. Presently available thermionic sources do not emit high current densities, but rather result in small currents being generated from small areas. In addition, thermionic sources must be heated, requiring special heating circuits and power supplies. Photo emitters have similar problems with regard to low currents and current densities.

Field emitter arrays (FEAs) are naturally small structures which provide reasonably high current densities at low voltages. FEAs typically comprise an array of conical, pyramidal or cusp-shaped point, edge or wedge-shaped vertical structures which are electrically insulated from a positively charged extraction gate and which produce an electron beam that travels through an associated opening in the charged gate.

The classical field emitter includes a sharp point at the tip of the vertical structure and opposite an extraction electrode. In order to generate electrons which are not collected at the extraction electrode, but can be manipulated and collected somewhere else, an aperture is created in the extraction electrode which aperture is significantly larger (e.g. two orders of magnitude) than the radius of curvature of the field emitter. Thus, the extraction electrode is a flat horizontal surface containing an extraction electrode aperture for the field emitter. The field emitter is centered horizontally in the extraction electrode aperture and does not touch the extraction electrode, although the vertical direction of the field emitter is perpendicular to the horizontal plane of the extraction electrode. The positive charges on the edge of the extraction electrode aperture surround the field emitter symmetrically so that the electric field produced between the field emitter and the extraction electrode causes the electrons to be emitted from the field emitter in a direction such that are collected on an electrode (anode) separate and distinct from the extraction electrode. A very small percentage of the electrons are intercepted by the extraction electrode. The smaller the aperture, i.e., the closer the extraction electrode is to the field emitter, the lower the voltage required to produce field emission of electrons.

It is difficult to create FEAs which have reproducibly small radius-of-curvature field emitter tips of conducting materials or semiconducting materials. Furthermore, it is equally difficult to gate or grid these structures where the gate-to-emitter distance is reasonably small to provide the necessary high electrostatic field at the field emitter tip with reasonably small voltages. The radius of curvature is typically 100–300 angstroms (Å) and the gate-to-emitter distance is typically 0.1–0.5 micrometers ($\mu$m).

Current methods of manufacturing FEAs include wet etching, reactive ion etching, and a variety of field emitter tip deposition techniques. Practical methods generally require the use of lithography which has a number of inherent disadvantages including the high cost of the equipment needed. Furthermore, the high degree of spatial registration requires expensive high resolution lithography.

To a large extent, these prior art problems were overcome by Hsu et al., U.S. Pat. No. 5,584,740 and Gray et al., U.S. Pat. No. 5,382,185, both of which are incorporated herein by reference for all purposes in their entirety. The '740 and '185 patents describe a thin-film-edge emitter cell including a substrate having a protuberance extending therefrom, a conformally deposited insulating layer over the substrate and vertical sidewall of the protuberance, an emitter film conformally deposited upon the insulating layer and the vertical sidewall thereof, and a gate metallization layer parallel to the vertically extending portion of the emitter film. The emitter film extends vertically beyond the protuberance. U.S. Pat. Nos 5,214,347 and 5,266,155 to Gray, both are which are incorporated-by-reference herein in their entirety for all purposes, describe horizontal thin-film edge field emitters and gated field emitters.

Because of the parallel orientation of the emitter film relative to the gate, the insulating layer between these elements in those patented devices must be sufficiently thin so that, at the emitter tip, the gate generates a field capable of extracting electrons at the tip. The dependence of the gate to tip distance upon insulating film thickness requires a trade off between the reduced susceptibility to pinhole defects and voltage breakdown offered by thicker insulating films and the increased voltage demands caused by the resulting additional gate to tip distance. Additionally, the parallel orientation of the gate layer creates a high capacitance. In turn, this high capacitance increases the RC time constant, reducing frequency response and power efficiency.

Commonly-owned U.S. application Ser. No. 09/045,853 filed on Mar. 23, 1998, which is incorporated herein by reference in its entirety, describes an improved field emitter cell/array that can potentially surpass the current conical or pyramidal tip FEAs both in terms of performance and cost. In particular, the FEAs described in the '853 application provides various performance advantages including higher emission current, lower voltage, lower capacitance, higher transconductance, resistance to "poisoning" by ambient gas, resistance to oxidation and resistance to blunting by back-ion bombardment. In fact, we have found that the FEAs of the '853 application has better oxidation resistance than any FEA known to date. Furthermore, the FEAs of the '853 application can be manufactured at relatively low cost as compared to prior devices. For example, the manufacture of FEAs of the '853 application requires only about one-third as many processing steps as the conical tip FEAs. In addition, lithography can be replaced with stamping technology in making the one-step masks for producing the starting template structures described in the '853 application.

However, the FEAs disclosed in the '853 application typically exhibit gate currents of about 7 to about 15% of the anode current. Although gate currents of these sizes are acceptable for applications that involve low currents and low power levels (e.g., field emitter displays), they cannot be tolerated in applications that require high currents and high power levels (e.g., power switching, microwave, and millimeter wave power amplifiers). Specifically, power dissipation at greater than about 1% gate current would damage the FEA.

SUMMARY OF THE INVENTION

Accordingly, it is an object of the present invention to provide a field emitter cell that exhibits significantly reduced gate currents.

It is another object of the present invention to drastically reduce the gate current in field emitter cells to as low as less than about 1% of the anode current.

It is a further object of the present invention to provide a field emitter cell that retains all the advantages (e.g., relatively low manufacturing cost, high emission current, low voltage, low capacitance, high transconductance, resistance to "poisoning" by ambient gas, resistance to oxidation and resistance to blunting by back-ion bombardment) of the field emitter cells described in U.S. application Ser. No. 09/045,853, and yet exhibit very low gate currents.

It is yet another object of the present invention to provide field emitter cells that are suitable for various applications including high voltage power switching, microwave, RF amplification and other applications that require high emission currents.

These and other objects of the invention are accomplished by a field emitter cell comprising:

an electrically conductive substrate layer;

an insulating layer directly upon said electrically conductive substrate layer; said insulating layer having a first perforation therethrough, said first perforation having an aperture, at least one essentially vertical sidewall and a bottom surface defined by said electrically conductive substrate layer;

an electrically conductive gate layer directly upon said insulating layer, said electrically conductive gate layer having a second perforation therein, said second perforation having an aperture larger than the aperture of said underlying first perforation; and an electrically conductive thin film edge emitter, electrically insulated from said gate layer and in electrical contact with said substrate layer, said emitter extending upward from at least within said first perforation and essentially parallel to said side walls, said emitter having an upper electron-emitting edge in close proximity to said gate layer, said electrically conductive thin film edge emitter forming a shell having said upper electron-emitting edge as an open upper end of said shell. If desired, the second perforation may be tapered; that is, the aperture of the second perforation may have a tapered shape. However, the opening of the second perforation may be non-tapered, where its sidewalls are parallel to the vertical sidewalls of the first perforation. If the perforations are cylindrical, the second perforation may be concentric with the first perforation.

In another embodiment, the field emitter cell of the present invention comprises:

an electrically conductive substrate layer;

an insulating layer directly upon said electrically conductive substrate layer, said insulating layer having a first perforation therethrough, said first perforation having at least one essentially vertical sidewall and a bottom surface defined by said electrically conductive substrate layer;

an electrically conductive gate layer directly upon said insulating layer, said electrically conductive layer having a second perforation therein, said second perforation being coincident with, or larger or smaller than, said underlying first perforation;

an electrically conductive thin film edge emitter, electrically insulated from said gate layer and in electrical contact with said substrate layer, said emitter extending upward from at least within said first perforation and essentially parallel to said side walls, said emitter having an upper electron-emitting edge in close proximity to said gate layer, said electrically conductive thin film edge emitter forming a shell having said upper electron-emitting edge as an open upper end of said shell; and a standoff (or spacer) layer extending upward from within said first perforation and essentially parallel to said side walls, said standoff layer being disposed between said emitter and said vertical side walls and having an upper portion that substantially shields said gate layer from said emitter.

In all embodiments of the present invention, the emitter layer(s) may optionally incorporate nanofilaments, which are usually hollow or solid, high-aspect-ratio needle-like structures. Furthermore, in all embodiments, the emitter layer(s) may extend from below the upper horizontal surface of the conducting substrate in cases where standoff layer(s) is/are used and the substrate is provided with a cavity with lateral dimensions greater than that of the inner dimension of the aperture defined by the bottom portion of the standoff layer(s).

The field emitter cell of the present invention may be made by various methods using known lithographic, deposition, and etching steps.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein:

FIGS. 5A through 7A show the processing steps involved in fabricating field emitter cells according to the present invention in which the conducting substrate is provided with a cavity with lateral dimensions greater than that of the inner dimension of the aperture defined by the bottom portion of the standoff layer(s).

DESCRIPTION OF THE PREFERRED EMBODIMENTS

Figure 1:
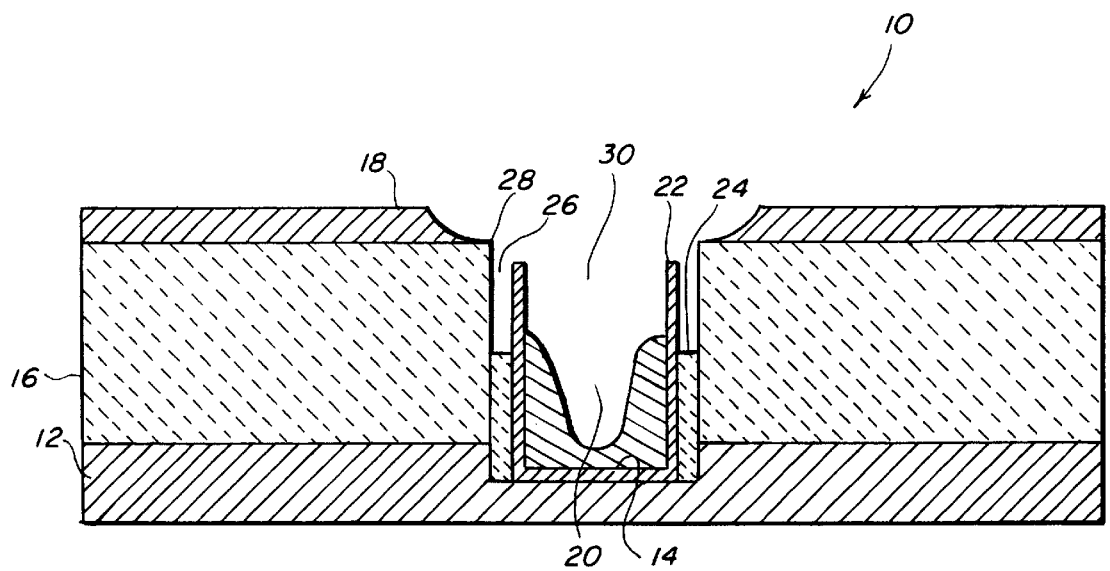
FIGS. 1 and 2 show the side (cross-sectional) and top views, respectively, of a field emitter cell according to the present invention in which the gate layer aperture is tapered.

The present invention includes a field emitter cell in which the thin-film-edge emitter is essentially perpendicular to the gate layer, insulation layer, and substrate. That unique arrangement maximizes the distance between the gate and substrate, and minimizes the distance between the gate and the emitter. The arbitrarily tall height of the emitter minimizes the capacitance, resulting in a low RC constant which enhances power efficiency in high frequency applications. Unlike prior art field emitter cells, the dimensions of the components of the field emitter cell are independent of each other. That is, in previously known FEAs such as conical FEAs, the component dimensions are mutually limiting.

Importantly, the significant reduction in the gate current achieved by the present invention is generally obtained by arranging the gate layer and the insulator layer(s) so that the insulator and/or standoff layer(s) block the gate layer from any direct line-of-sight from the emitter. Typically, the insulator layer near the region of the gate layer aperture becomes negatively charged. For example, the reduction in the gate current may be achieved by using a gate layer in which the perforation therein has an aperture that is larger in size than the aperture of the perforation in the insulating layer. In this way, a portion of the insulating layer can serve to substantially shield the gate layer from the emitter. Alternatively, a standoff (or spacer) layer may be used to insulate or shield essentially the emitter from a direct line-of-sight from the gate layer. While not wishing to be bound by any theory, it is believed that the reduced gate current arises from the emitted electrons having to travel well above the substrate (as a result of the shielding by the insulator and the negative charge on the insulator layer in a region near the gate layer) before there exists a direct line-of-sight from the electrons to the gate, at which point the electrons would be under the influence of the potential created by the anode electrode rather than the gate layer. In general, heat dissipation through the gate and associated degradation are lowered as the gate current is reduced.

The substrate layer can be a conductor, an n-doped semiconductor, a combination of n-doped and p-doped semiconductors, a resistive material, a transistor, or a composite, alloy, or multilayer structure including one or more of these classes of materials. The substrate layer, however, should be capable of conducting charge, with or without conduction control elements by which charge conduction can be controlled by individual or group-addressable means such as electrical, magnetic, optical, or mechanical methods. Throughout the present invention and claims, the terms "conductor" and "conducting material" include both normal conductors and superconductors unless otherwise stated. If a resistive material is used as the substrate layer, emission current can be controlled or limited to prevent burnout of the emitter and to provide emission area uniformity as well as a decrease in noise. A resistive material minimizes burnout by causing an IR drop in potential that results in current limiting in the field emitter cell.

The insulating layer that overlies the substrate, and underlies the gate layer, may be any electrically insulating material. Typical materials useful as the insulating layer of the present invention include, but are not limited to, oxides, diamond, glass, and organic materials (e.g., organic polymers).

In one preferred embodiment, the arrangement of the gate layer and the insulator layers is such that the insulating layer is capable of capturing electrons emitted from the emitter and become negatively charged, thereby shielding the emitted electrons from being subject to the positive gate charge in the local region close to the gate and thus repelling them into trajectories away from the gate and more towards the anode. Another benefit of this local negative charge is that the emitter will be protected from bombardment by residual ions. Positive ions (resulting from electron ionization of ambient residual gases) that are near these local negatively charged regions will be attracted towards these regions and land on them rather than impinging on the emitters.

The sidewalls of the first perforation in the insulating layer in the present invention should be essentially vertical. Typically, these walls extend at an angle of at least about 80° (and more often at an angle of at least 85°) with respect to the substrate and preferably extend at an angle of substantially 90° with respect to the substrate. Because of its superior electrical and mechanical properties, a cylindrical structure is most typical, but is not required for the practice of this invention. Any other shape (e.g, a shape having a square, rectangular, zig-zig, spiral, etc. cross-section) may be used.

The emitter is preferably any low work function material that is protected from ready oxidation. Typically, the emitter is selected from among the same class of materials as is the substrate layer. The emitter layer should be capable of conducting electrons. A preferred conducting material is lithium sandwiched between platinum layers, although other materials can be readily used. Typically, materials useful as the emitter include platinum, its compounds and its alloys; osmium, its compounds and its alloys; ruthenium, its compounds and its alloys; and lithium, its compounds and its alloys. Other suitable materials include W, Mo, Ni, Ti, Cr and carbon (with or without a diamond-like structure) having significant $sp^2$ content. Also, compound materials such as silicon carbide and transition metal carbides such as zirconium carbide, hafnium carbide, titanium carbide, and transition metal nitrides may be used. The emitter, like the substrate, may also be an inhomogeneous composite or a multilayer structure. Typically, when the emitter is an alloy, composite (mixture or inhomogeneous) or multilayer structure, at least one of the materials typically has a low work function. For example, alloys of Li with Pt and/or Ru are useful as an emitter material in the present invention. Typically, a path for electron conduction should be provided between the substrate and the emitter. If a multilayer structure is used, only one of the layers need to be electron conductive; the one layer can be a conductor, a semiconductor, a resistive layer, or a transistor. This layer is in electrical contact with the substrate. The other layers can be any other suitable material, e.g., a nonconducting layer. If a resistive material is used for the emitter, the emission current can be controlled to prevent emitter burnout and to provide area uniformity as well as a decrease in noise. A resistive material minimizes burnout by causing an IR drop in potential that results in current limiting in the field emitter cell. To be useful as a current-limiting resistive material, the resistivity must be high enough that the resulting IR drop is a significant fraction of the total potential between the emitter and the gate.

In one particularly preferred embodiment, the emitter may be a noble metal/low work function material/noble metal sandwich, typically with each layer of the sandwich having a thickness of about 0.005 to about 0.1 microns. For example, Ru/Li/Ru and Pt/Li/Pt sandwiches have provided excellent results. Other noble metals useful as outer layers (layers covering the emitter layer except the top emitting edge) in an emitter structure for the present invention include Pd, Au, Ir and Os. Non-noble metals, such as W, Mo, Ni, Ti, Cr, and V may also be used as the outer layers in an emitter structure for the present invention. Insulators, and/or semiconductors, may also be used for the outer layers of the emitter multilayer structure, for example, to protect the emitter from oxidation. Useful materials for protective outer layers on the emitter include AlN, TiAlN, AlTiN, BN, TiN, SiN, SiC, diamond, and carbon having a structure similar to diamond (i.e., diamond-like carbon). In these embodiments, the outer layers can, but do not necessarily, protect the low work function emitter material against oxidation, since only the emitting tip of the low work function emitter material needs to be exposed.

As stated above, the actual emitting material itself may preferably be any low work function material. Typical low work function emitter materials include, but are not limited to, alkali metals such as Li, K, Na, Rb, and Cs, alkaline earth metals such as Mg, Ba, Sr, and Ca, transition metals such as Y and Zr, and other metals such as Th, and alloys or compounds containing such materials, such as transition metal carbides (e.g., ZrC, HfC, TiC or the like) and transition metal nitrides (e.g., ZrN, HfN, TiN or the like).

Typically, the emitter layer of the present invention has sharp tips having a radius of curvature of about 20 nm or less, and more often of about 10 nm or less and most often about 5 nm or less.

As described in detail further below, the emitter of the present invention may, if desired, include nanofilaments having ends that serve as highly effective emission sites.

It is also within the scope of the present invention, although not absolutely necessary, to include an optional layer between the substrate layer and the emitter and/or insulating layer. This optional layer may be selected from various materials including insulating materials, resistive materials, semiconducting materials, conducting materials, and combinations thereof The advantages of including such an optional layer include, e.g., promotion of better electrical contact or adhesion between emitter and substrate, incorporation of active or passive current control elements for individual or group emitters, including transistors, p-n junctions, resistors, etc.

The gate layer may be a single layer, multilayer, composite, alloy, or elemental material. The gate should, however, include at least one material that is a conductor, a semiconductor, or a resistive material. A resistive gate layer or a composite including a resistive material minimizes burnout by causing an IR drop that results in current limiting in the gate layer. Unlike the emitter and the substrate, the gate layer need not conduct electrons. That is, the gate may be a conductor by virtue of hole rather than electron mobility. The use of a p-type semiconductor in the gate layer may be particularly advantageous, since it minimizes electrons from emitting from the gate, causing spurious and unregulated emission.

As mentioned previously, in one embodiment, the perforation in the gate layer has an aperture that is larger than that of the underlying first perforation in the insulating layer. In this way, the gate layer is blocked or shielded by the insulating layer(s) against any direct line-of-sight with respect to the emitter. Thus, any emitted electrons would need to travel well above the substrate before there exists a direct line-of-sight from the electrons to the gate, at which point the electrons would be under the influence of the potential created by the anode electrode. The perforation in the gate layer can have vertical sidewalls that are essentially parallel to the vertical sidewalls of the perforation in the insulating layer. Alternatively, the perforation in the gate layer can define a tapered aperture that increases in size in a direction away from (i.e., normal to) the substrate layer. Other arrangements and configurations would be readily apparent to one skilled in the art, given the disclosure of the present invention that the gate layer be substantially blocked or shielded by the insulating layer from a direct line-of-sight with respect to the emitter.

As will be apparent, the starting template structure may have a concentric, but not coincident, gate layer at an offset from the edge of the perforation in the insulating layer. This type of structure is suitable for a gate material that is difficult to directionally dry etch. Examples of such materials that are difficult to directionally dry etch include, but are not limited to, chrome and nickel. Alternatively, the gate material may be etchable, such materials including, but not limited to, silicon and titanium nitride. If the gate material is etchable, a protection layer such as a chrome layer may be used to protect the gate from being tapered. The protection layer with its aperture coincident with the perforation in the insulating layer may either overhang or be coincident with the edge of the aperture of the gate layer. If desired, the protection layer may be removed by selective wet etching after the etching back of the standoff layer.

Alternatively, a non-coincident starting template can be provided. In such situations, the gate layer is usually etchable according to a dry or wet etching method. For these non-coincident starting templates, a structure comprising a substrate, insulator layer, a gate layer, and a protection layer is first provided. Then coincident perforations are provided through the protection layer, gate layer, insulator layer and optionally part of the substrate. After that, the perforation in the gate layer may be offset by using selective isotropic dry or wet etching.

In another embodiment, the perforation in the gate layer may be coincident with, or larger or small than, the perforation in the underlying insulating layer. In this embodiment, however, the gate layer is substantially shielded from the emitter by using a standoff (or spacer) layer extending upward from at least within the perforation in the insulating layer (i.e., the insulating layer that overlies the electrically conductive substrate layer and underlies the gate layer). Typically, this standoff layer is essentially parallel to the vertical sidewalls of the perforation in the insulating layer and is disposed between the emitter and the vertical sidewalls of the perforation in the insulating layer. In general, the upper portion of the shielding standoff layer will be the portion substantially shielding the gate layer from the emitter.

The material for the standoff (or spacer) layer which blocks the line-of-sight between the emitter and the gate layer may be selected from various materials including, but not limited to, silicon nitride, aluminum oxide, silicon dioxide, or any other good insulator that will not be etched when etching the second vertical standoff (or spacer) layer described below. The material for the standoff (or spacer) layer which blocks the line-of-sight between the emitter and the gate layer preferably (but not necessarily) is capable of holding a negative charge.

In most cases, it is desirable to have a second vertical standoff (or spacer) layer extending between the first standoff or spacer layer (i.e., the shielding layer) and the emitter, usually extending to somewhat less than the height of the emitter. Mainly, the second standoff layer provides mechanical support for the emitter and, together with the first standoff layer, determines the distance between the emitter and the gate aperture edge. Any material may be used for the second standoff layer. For example, the second standoff layer may be an insulator, a conductor, or a semiconductor. If the second standoff layer is an electron-conducting material, it can also serve as an electron transport medium and heat sink to the emitter. If the second standoff layer is a resistive material, it can serve as a control mechanism for current flow. The second standoff layer should be capable of being etched without substantially etching the first standoff layer (i.e., the materials for the first and second standoff layers are different).

The absolute and relative thicknesses of the various layers will depend upon the intended use of the device. The best determination of these parameters for any known application may be determined by routine experimentation combined with knowledge possessed by those having ordinary skill in the art of field emitter cells and arrays. Nevertheless, some additional guidance is offered here. A major advantage of the present invention is that the thicknesses of the various layers and component dimensions, such as emitter height, gate aperture size, gate-emitter separation, and insulator layer aperture size are individually and independently selectable.

The base and the conductive part of the substrate of the invention may be any thickness. In typical applications, the base and the conductive part of the substrate will each be from about 0.5 $\mu$m to about 1000 $\mu$m, and more often about 0.5 $\mu$m to about 100 $\mu$m. Typically, the insulating layer will have a thickness of about 0.1 $\mu$m to about 10 $\mu$m and more often about 0.5 $\mu$m to about 10 $\mu$m. The gate layer typically has a thickness of about 0.1 $\mu$m to about 1 $\mu$m. In the case where a standoff layer is used for shielding the gate layer from the emitter, the shielding standoff layer can have a thickness of about 100 Å to about 0.1 $\mu$m. The second standoff layer, if used, may have a thickness of about 100 Å to about 1 $\mu$m. More often, the second standoff (or spacer) layer has a thickness of about 0.1 $\mu$m to about 0.5 $\mu$m.

It is often highly desirable to provide a conducting substrate having a cavity with dimensions greater than that of the inner dimension of the aperture defined by the standoff layer(s) at the bottom to extend the depth and width of the emitter layer into the substrate in order to protect the contacting portion of the emitter layer to the substrate and to provide a larger contact area between the emitter layer and the substrate. This cavity can be fabricated by selective etching of the substrate immediately after the standoff layer(s) has/have been directionally etched back.

If desired for handling or for a specific application, the substrate/insulator/emitter/gate (with or without standoff layer(s)) may be supported upon a base. If used, the base may be any material, conductor, semiconductor, or insulator, or any combination of these materials.

Also, adhesion layers may be used, if needed, between the insulating layer and the gate layer, between the emitter layer and the standoff layer(s), between the insulating layer and the standoff layer(s), and/or between the emitter layer and the substrate, as well as between two layers of a multilayer component. Typical adhesion layers include Cr, Ti, and TiN. The adhesion layer may be included as a part (i.e., sublayer) of a multilayered substrate, insulating layer, spacer layer, gate layer, and/or emitter layer.

In addition, the field emitter cell of the present invention can include, if desired, a protection layer on top of the gate layer during fabrication of the field emitter cell. During fabrication, the protection layer serves to prevent etching and tapering of the gate layer. Where the gate layer is etchable by standard dry etching methods, the protection layer may be non-etchable by such methods so that a portion of the protection layer extends over the gate layer along the region where the gate layer has been etched away. This provides added protection against the upper corner of the insulator aperture being eroded during subsequent processing. In the case where the protection layer is initially coincident with the gate layer, the protection layer can remain and serve to strengthen the gate layer. If the protection layer is conductive and initially overhangs the gate layer, it should be removed to achieve the off-set gate structure, prior to completion of the emitter cell fabrication.

Furthermore, although not absolutely necessary, the field emitter cell of the present invention may optionally comprise remnants of an overlayer, which is useful for the purpose of protecting the bottom and the sidewall of the emitter from processing damage, such as from ion beam sputtering or etching damage. If a metal overlayer such as tungsten is used, it can provide better electrical contact for the emitter as well as current sharing and heat removal as compared to silicon or silicon dioxide.

In all of the embodiments described herein, it may be desirable to include nanofilaments (nanowires or nanotubes) in the emitter film layer(s). These nanofilaments are usually hollow (nanotubes) or solid (nanowires), needle-like structures having a high aspect ratio. Typically, the nanofilaments have diameters from just a few up to about tens of nanometers and lengths of up to about several microns. The most well known nanofilaments are carbon nanotubes, which can be single-walled, multiple-walled, hollow or filled structures. Such carbon nanotubes are described in Dresselhaus, et al., *Science of Fullerenes and Carbon Nanotubes*, Academic Press, San Diego, Calif., 1996, which is incorporated herein by reference. Other nanofilaments usually comprise Si, SiC, TiC, NbC, $Fe_3C$, GaN, and the like, as well as combinations thereof. If nanofilaments are used, it may be preferable to provide an offset gate in order to minimize electrical shorts between the emitter film layer and the gate by the protruding nanofilaments. Carbon nanotubes and Si and SiC nanowires have been tested as ungated field emitter cells, and these cells have shown very promising field emission characteristics attributed to the chemical stability of carbon, mechanical strength of the tube and the extremely small radius of curvature of the tube ends from which emission takes place. The same advantages would be expected when nanofilaments are incorporated into the field emitter cells according to the present invention.

In all the embodiments where nanofilaments are used, the final cell structures are more or less the same as those in which nanofilaments are not used except that nanofilaments are attached to, embedded in, or sandwiched between the vertical emitter layers of the cells. The cells including the nanofilaments may be fabricated either to feature a capping (or sandwiching) conducting protection layer for good electrical and mechanical contacts or without such a capping (or sandwiching) conduction protection layer. By using nanofilaments having lengths which are a sizable fraction of the emitter film cylinder diameter, the nanofilaments will end up with a large vertical component (i.e., parallel to the emitter film layer) due to the stronger overall adhesion or contact area of the filament in this orientation. Thus, there will be many nanofilaments with ends protruding over the top edge of the emitter film layer, and these ends will serve as highly effective field emission sites. The vertical positions of these nanofilaments are likely to be uneven which, as mentioned previously, calls for gates that are offset to avoid electrical shorting.

Figure 2:
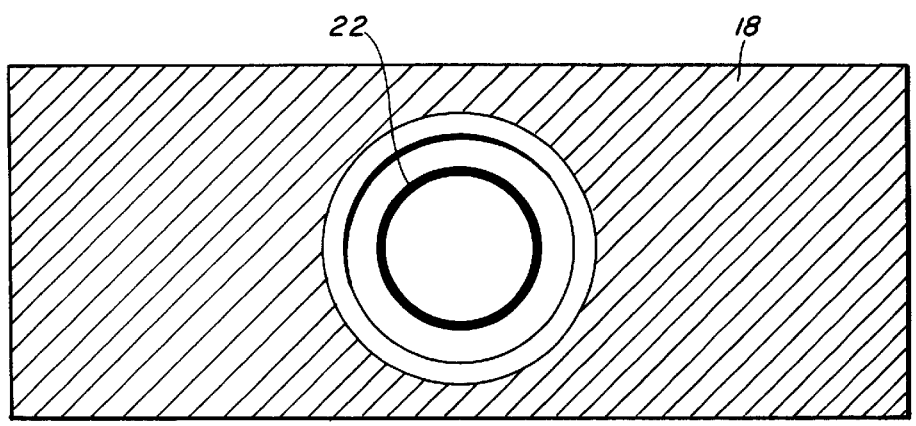

FIG. 1 shows a side view of a typical field emitter cell 10 according to the present invention. Substrate 12 has a depression 14 with essentially vertical sidewalls. Insulator layer 16 directly overlays substrate 12. Gate layer 18 directly overlays insulator layer 16, and has a perforation 30 that defines a tapered aperture. Insulator layer 16 has therein a perforation 20, with vertical sides, extends upward from depression 14. Substrate 12 therefore defines the bottom of perforation 20. Emitter 22 extends, essentially vertically upward from the bottom of perforation 20 to the vicinity of an edge of insulator layer 16. A spacer 24 extends vertically between insulator layer 16 and emitter 22, but well short of the top of emitter 22. Although not required, depression 14 provides physical support and better electrical contact for emitter 22. A vacuum gap 26 exists between the upper portion of the emitter and insulator layer 16. If desired, insulating layer 16 may be undercut as long as sufficient top portion remains so that there is no direct line of sight between the emitter layer and the gate layer. FIG. 2 shows a top view of the device shown in FIG. 1.

Figure 1A:
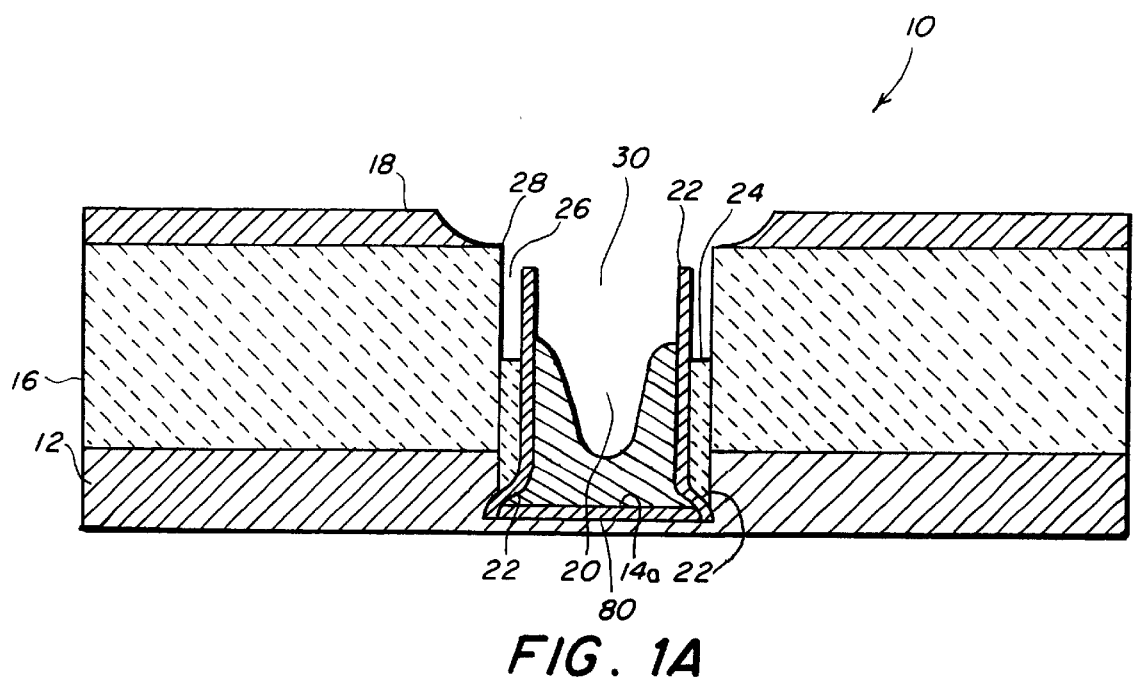
FIG. 1A shows the side (cross-sectional) view of a field emitter cells according to the present invention in which the gate layer aperture is tapered and the conducting substrate is provided with a cavity with lateral dimensions greater than that of the inner dimension of the aperture defined by the bottom portion of the standoff layer(s).

FIGS. 1A shows an alternative, preferred embodiment which is the same as the embodiment shown in FIGS. 1 and 2, except substrate 12 has a depression 14a with an enlarged cavity 80 (i.e., the cavity has lateral dimensions greater than those of the aperture defined by the standoff layer(s)). Thus, as explained previously, the substrate 12 can have a depression that has an enlarged cavity with dimensions greater than those of the inner dimension of the aperture defined by the standoff layer(s) at the bottom to extend the depth and the width of the emitter into the substrate in order to provide a larger contact area between the emitter layer and the substrate. It is to be understood that the enlarged cavity can have a shape other than those shown in the figures, as long as the objects of the present invention are met. FIG. 1B shows the optional layer (15) as being optionally the length of the substrate. FIG. 1C shows the optional layer (15) as being optionally less than the length of the substrate.

Further, it is to be understood that the substrate 12 can be provided with the above-described enlarged cavity for all embodiments of the present invention, including the embodiments shown in FIGS. 8–24 and 28–31.

A field emitter cell according to the present invention, or array thereof, may be produced by a variety of methods. In one typical procedure, shown in FIGS. 3 through 7, conducting substrate 12, with or without a base (not shown), is provided on at least its upper surface (with respect to any base that may be present) with insulating layer 16 and gate layer 18 overlaying insulating layer 16. The insulating layer may be provided by any means, such as oxidation of the substrate layer, bonding of a preformed insulating layer, CVD deposition, CBD deposition, physical deposition such a evaporation or sputtering, ion-implantation, etc. Likewise, the method of providing the gate layer is not particularly critical to the present invention. Methods such as melt bonding of a preformed layer of conducting material, evaporative deposition, CVD (chemical vapor deposition), CBD (chemical beam deposition), electroplating, electroless plating, sputter deposition, and ion-implantation may be used. If a gate layer etchable by standard directional dry etching is used, the gate layer is desirably etchable by the same directional dry etch method (reactive ion etching (RIE) or ion beam sputtering) to be used for removing the standoff insulator layer.

Figure 3:
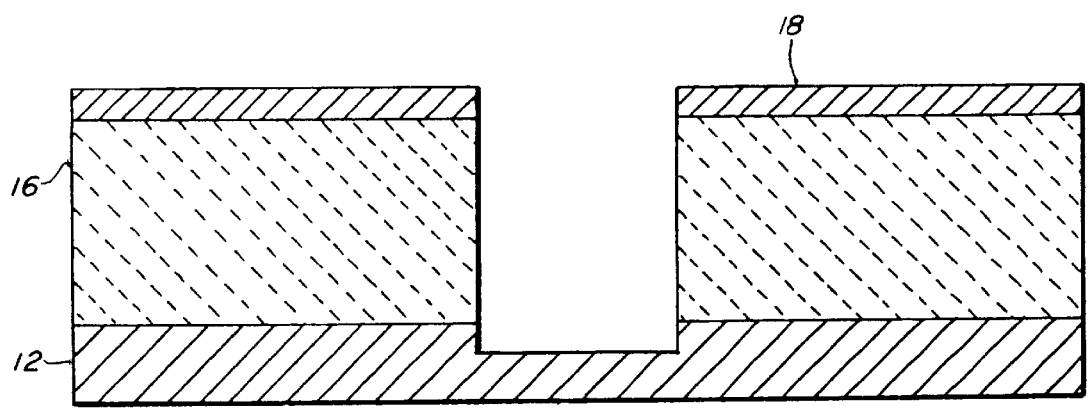
FIGS. 3 through 7 show the processing steps involved in fabricating a field emitter cell according to the present invention in which the gate layer aperture is tapered.

Perforation 20 forms a well that extends at least to the upper surface of the conducting substrate. A variety of methods may be used to provide the needed perforations in the gate layer and the insulating layer. These methods include, but are not limited to, reactive ion etching, ion beam milling, lift-off, and plating/lift-off. The reactive ion etching method involves the reactive ion etching of the laminate (e.g., Si substrate/$SiO_2$ insulating layer/p-type Si layer) through a lithographically patterned mask. The ion beam milling method may be carried out on a structure comprising, e.g., a resist mask on Cr, which in turn is on a p-type Si layer. The lift-off method involves providing a solid post of resist, which can be removed following gate material deposition on the surface around (and on top of) the post. The plating/lift-off method involves the use of electroless plating of a Ni layer on a catalyst comprising Pd particles selectively bonded to a silane (e.g., aminosilane) monolayer of the self-assembled type around resist posts, which method is described in detail in U.S. Pat. Nos. 5,079,600 and 5,077,085, both of which are incorporated herein by reference. In another known method, perforations can be made by mechanical stamping, using, for example, the method described by Stephen Chou, *Science*, Vol. 272, Apr. 5, 1996, pages 85 through 87, the entirety of which is incorporated herein by reference. In an alternative method, posts, for example of Si, may be provided on the substrate, for example by RIE. Then, an insulator layer is deposited over the post structure and substrate such that insulator thickness is greater than the height of the post. The resulting structure is then planarized, mechanically polished, or chemically-mechanically polished (CMP) to provide a flat upper surface. Selectively etching back of the insulator leaves a portion of the post protruding above the insulator layer. Then, directional deposition of a gate material over the top of the post and the substrate is performed. The resulting pillar or post may then be preferentially etched to provide a hole, with essentially vertical sidewalls, through the gate layer and insulator layer. As shown in FIG. 3, the aperture of the gate film is initially coincident with the template hole, which includes the perforation 20 within insulator layer 16.

Figure 4:
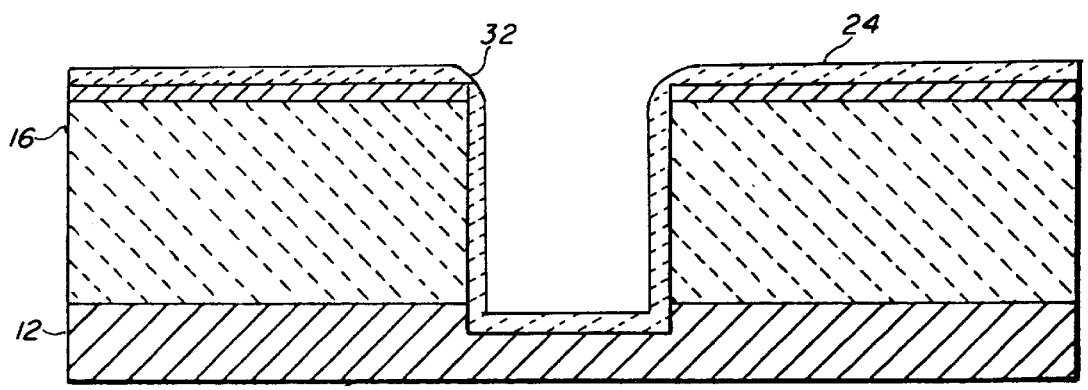
Figure 5:
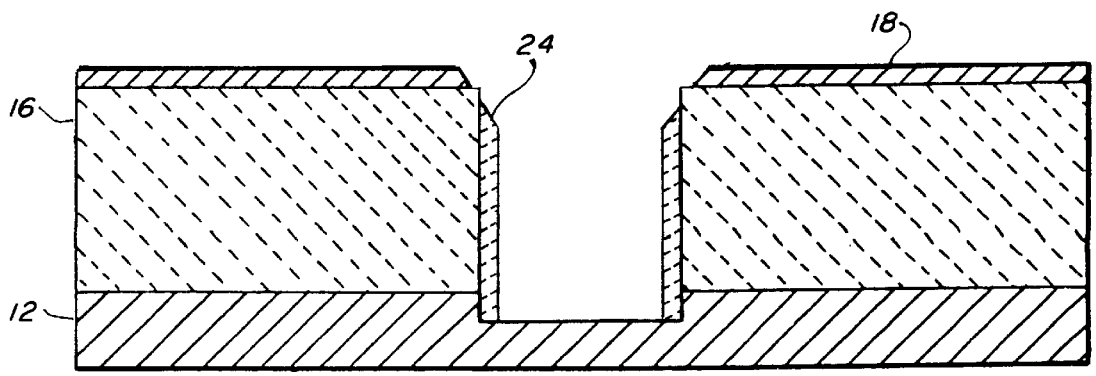

If desired, a standoff layer 24 is then deposited by any suitable method, e.g., chemical vapor deposition, under conditions that produce a thinner layer thickness at the corner 32 of the template hole than at areas on top away from the hole, as shown in FIG. 4. The horizontal portions of the standoff layer can be removed by directional etching. A slight overetching ensures that the bottom of the template hole is cleared of the standoff layer and has a depression as shown in FIG. 5. At this point, the portion of the gate layer near the edge of the original template hole is largely removed or is significantly thinner than before.

Figure 5A:
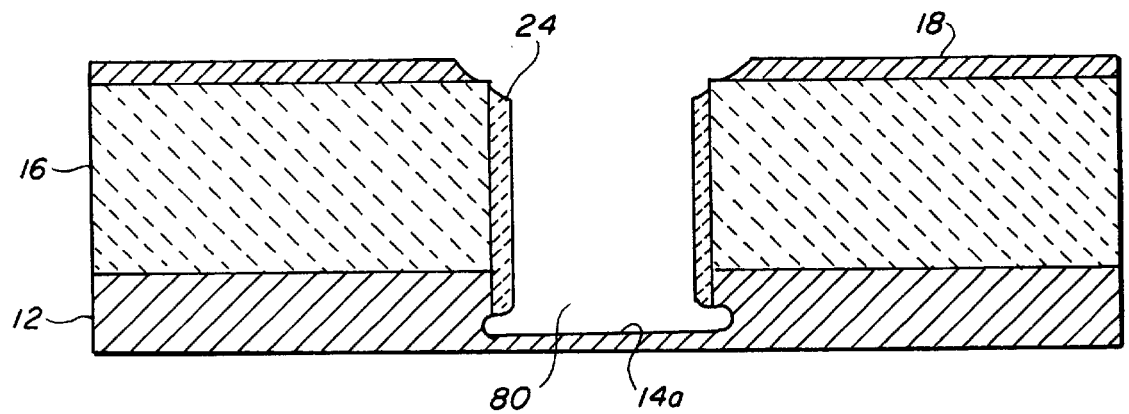

As shown in FIG. 5A, it may be preferable to use selective etching to produce a larger depression or cavity at the bottom of the template hole to permit the extension of the depth and the width or only the width of the emitter into the substrate in order to provide a larger contact area between the emitter layer and the substrate. It is to be understood, of course, that the enlarged depression or cavity can be used, and is preferred, in all embodiments of the present invention, including the embodiments shown in FIGS. 8–24 and 28–31.

Figure 6:
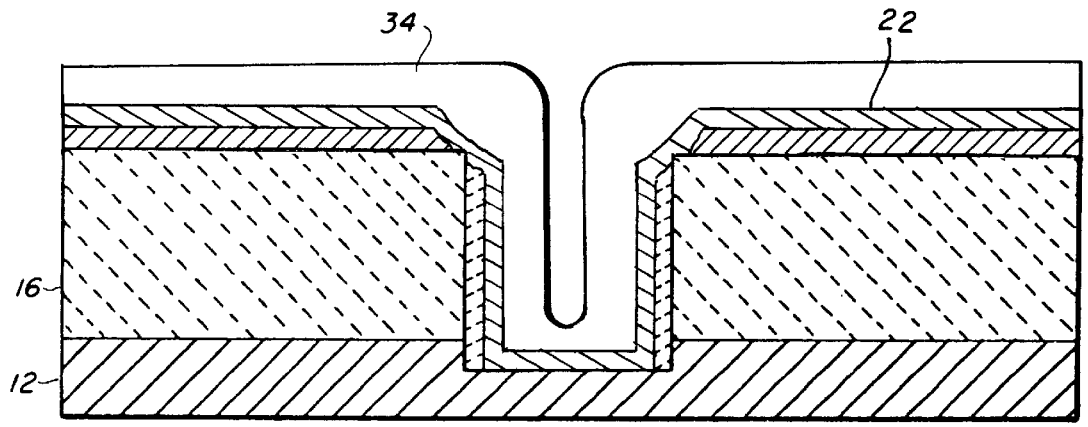
Figure 7:
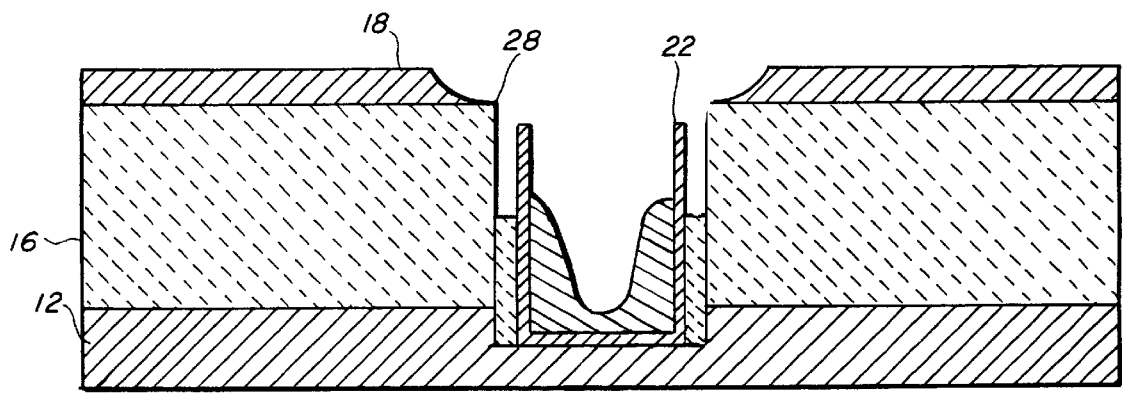
Figure 6A:
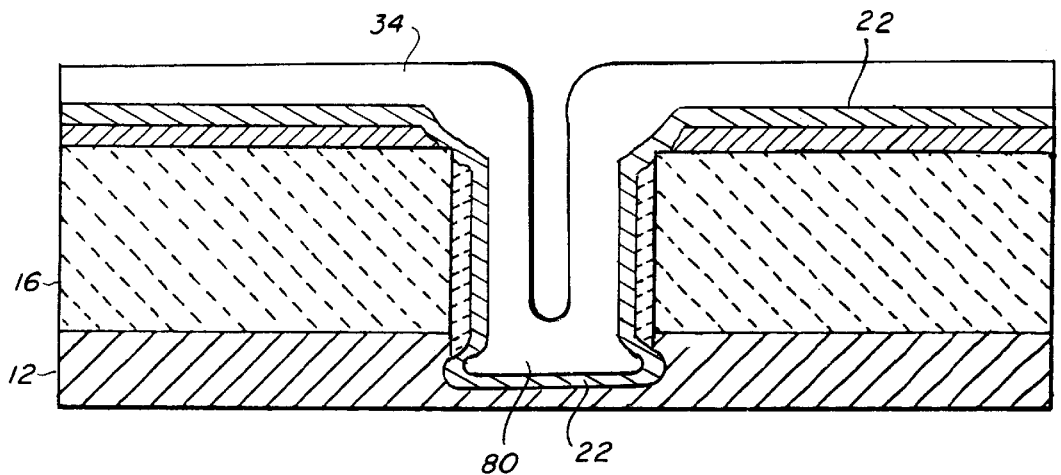
Figure 7A:
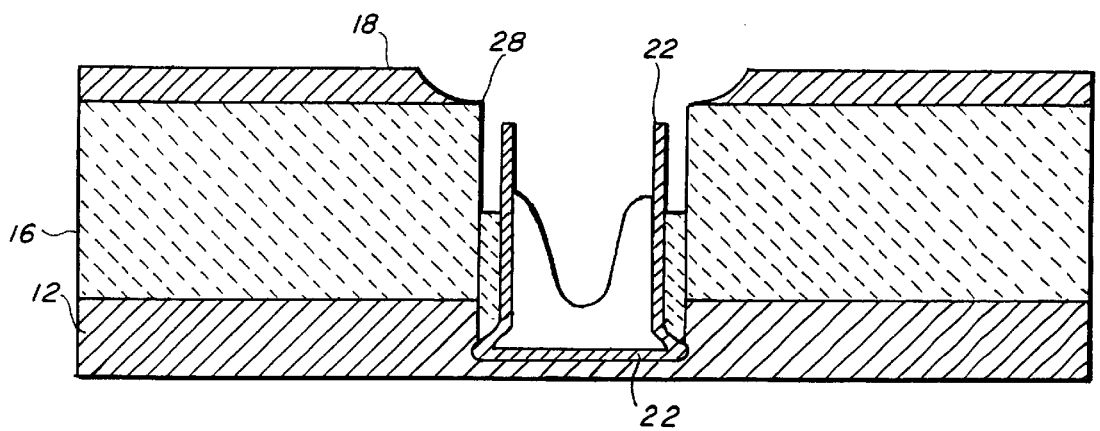

Next, as shown in FIGS. 6 and 6A, an emitter film (or multilayer sandwich films, not shown, but as described in U.S. application Ser. No. 09/045,853, which is incorporated herein by reference) is deposited preferably by a conformal method, e.g., chemical beam deposition or chemical vapor deposition, followed by the optional deposition of a considerably thicker overlayer 34 of a preferentially removable material (e.g., an insulator, semiconductor or a conductor). Examples of such preferentially removable overlayer materials include silicon dioxide, silicon, tungsten, molybdenum, as well as any material readily removable by RIE or wet etching processes. As mentioned above, the purpose of the overlayer is to protect the bottom and sidewall of the emitter from ion beam sputtering or etching damage. If the template hole is small enough (i.e., less than 1 micron), it is advantageous to fill the perforation with the overlayer material. The horizontal and corner portions of the overlayer and the emitter layer are then removed by directional etching. The upper portions of the resulting standoff layer and the overlayer can be selectively removed (e.g., hydrofluoric acid in the case of silicon dioxide) so as to let the vertical emitter edge protrude above the remaining standoff layer and the overlayer, as shown in FIGS. 7 and 7A. However, the recessing of the standoff layer should be done so as to not significantly alter the substrate insulator material (in particular at the corner 28. For example, the insulator can be silicon nitride or thermal silicon dioxide, while the standoff layer can be CVD silicon dioxide. Hydrofluoric acid would attack the CVD silicon dioxide at a much faster rate than it would the thermal silicon dioxide or the silicon nitride. Thus, the edge of the gate layer is tapered due to the varying thickness of the deposited standoff layer near the corner of the template hole.

Figure 8:
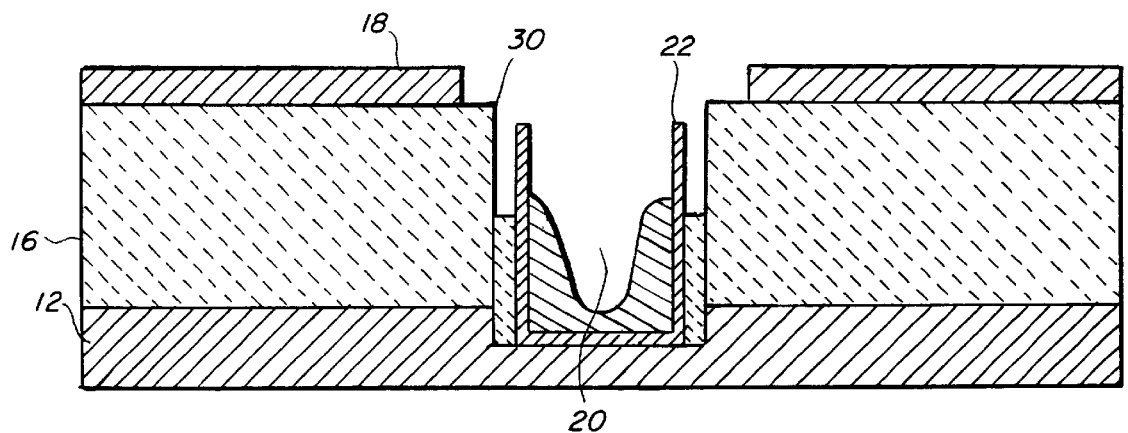
FIGS. 8 and 9 generally show the side (cross-sectional) and top views, respectively, of a field emitter cell according to the present invention in which the gate layer aperture is offset with respect to the insulating layer aperture.
Figure 9:
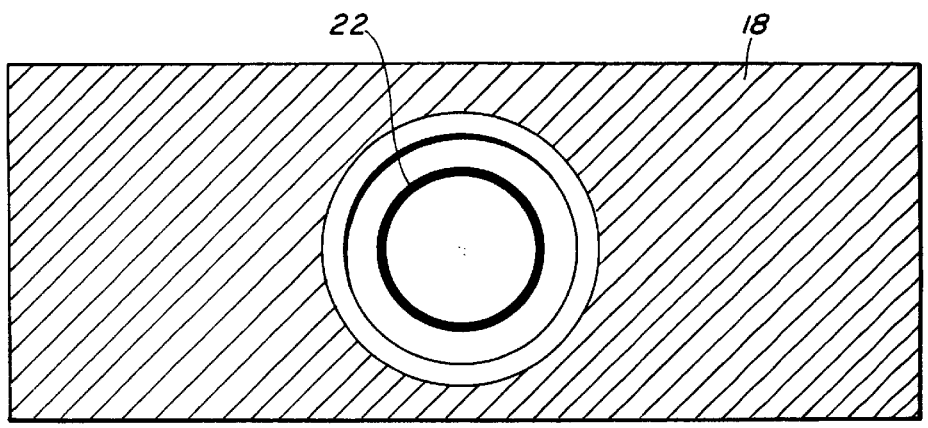
Figure 10:
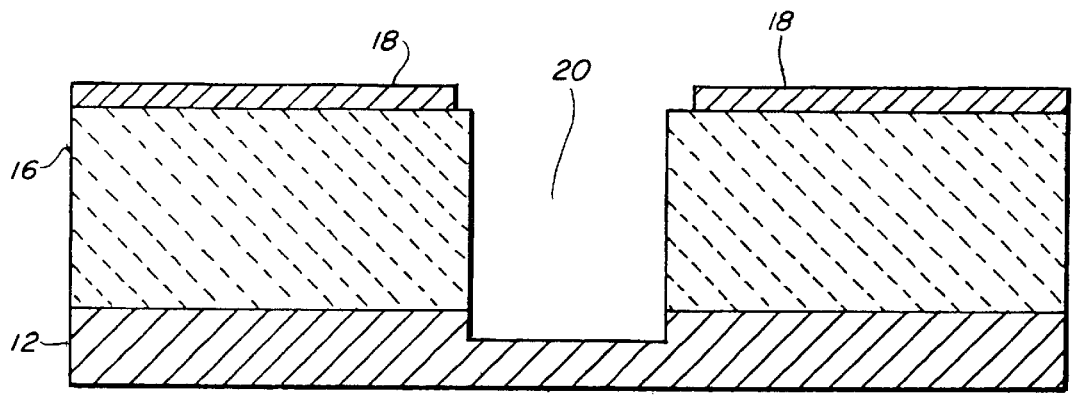
FIGS. 10 through 14 show the processing steps involved in fabricating a field emitter cell according to the present invention in which the gate layer aperture is non-tapered and offset with respect to the insulating layer aperture and in which the gate layer is not etchable by standard dry etching.
Figure 11:
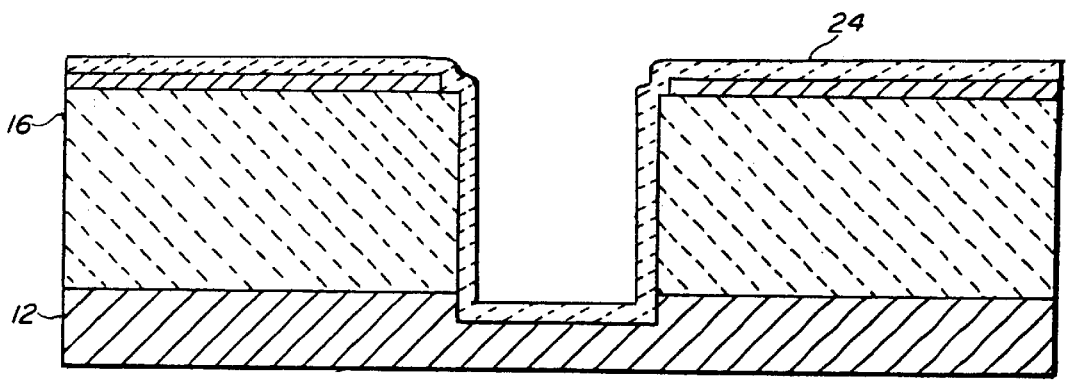
Figure 12:
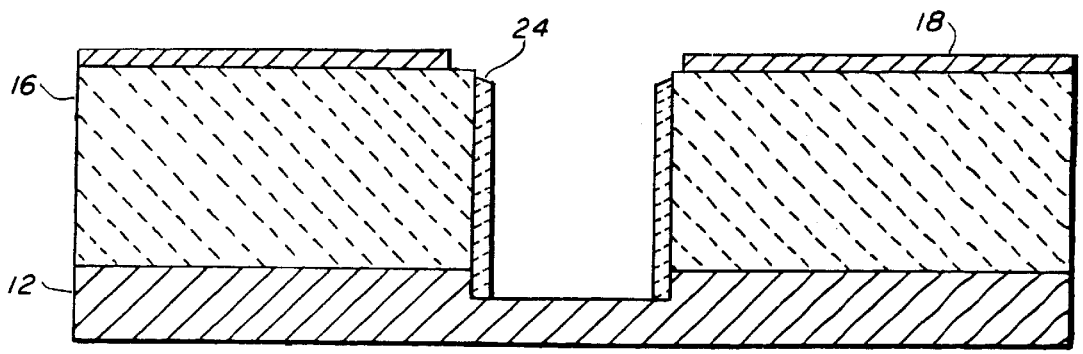
Figure 13:
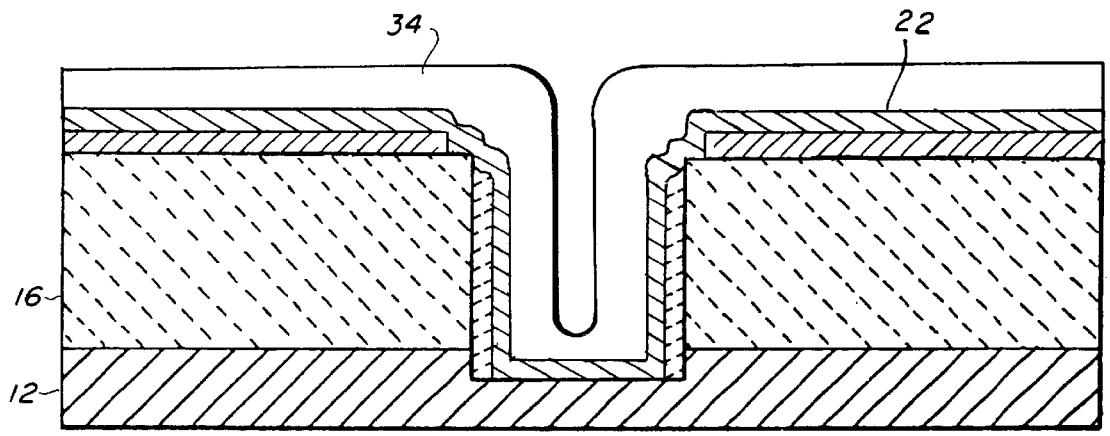
Figure 14:
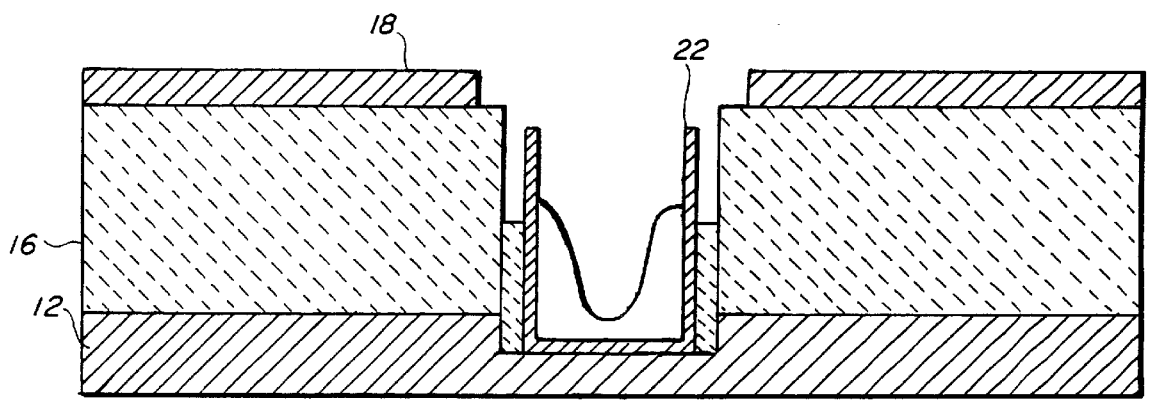

FIGS. 8 and 9 show an alternative embodiment in which the starting template structure has a concentric, but not coincident, gate layer 18 at an offset from the edge of perforation 20 in the insulating layer 16. Thus, the perforation 30 of the gate layer is larger than the perforation 20 of the insulating layer. The processing steps, which are illustrated in FIGS. 10 through 14, are similar to those shown in FIGS. 3 through 7. In particular, FIG. 10 shows the offset position of the gate layer, which is not etchable by standard RIE methods; FIG. 11 shows the deposition of the standoff layer; FIG. 12 shows the etching back of the standoff layer; FIG. 13 shows the deposition of the emitter layer and overlayer; and FIG. 14 shows the directional etch removal and recessing of the remaining standoff layer and overlayer.

Specifically with respect to FIGS. 10–14, the starting template structure has a concentric, but not coincident, gate layer 18 at an offset from the edge of the perforation 20 in the insulating layer 16, as shown in FIG. 10. As discussed above, this type of structure is suitable for a gate material that is difficult to directionally dry etch. Examples of such materials that are difficult to directionally dry etch include, but are not limited to, chrome and nickel. Again, it is preferable to enlarge the depression at the bottom of the template hole in the substrate after the etch back of the standoff layer using selective etching (without affecting other components) to enhance electrical contact between the substrate and the emitter.

Figure 15:
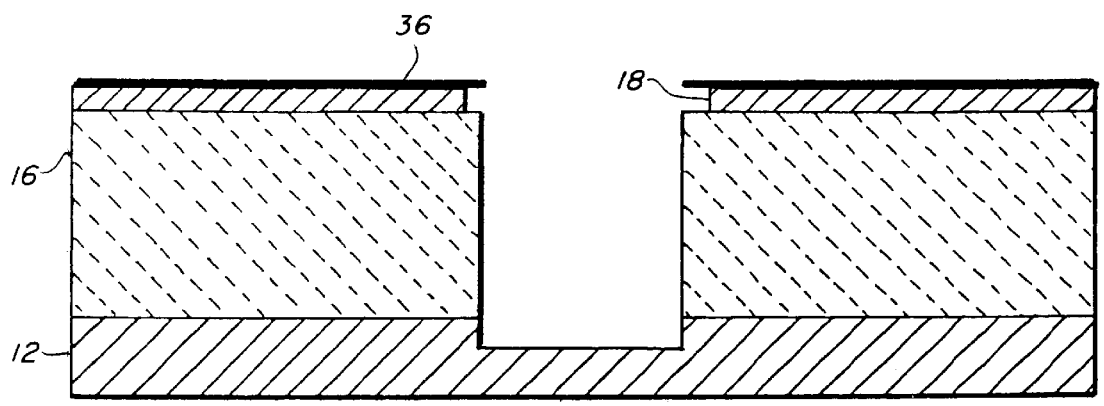
FIGS. 15 through 19 show the processing steps involved in fabricating a field emitter cell according to the present invention in which the gate layer aperture is non-tapered and offset with respect to the insulating layer aperture and in which the gate layer is etchable by standard dry etching.
Figure 16:
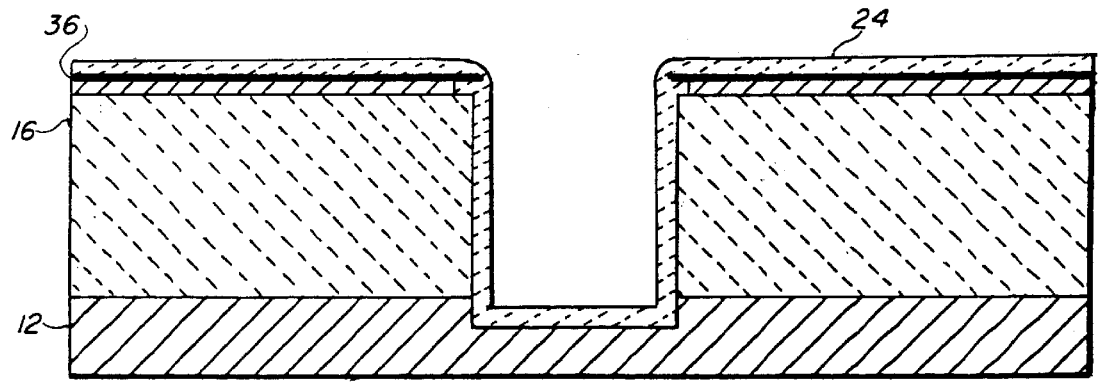
Figure 17:
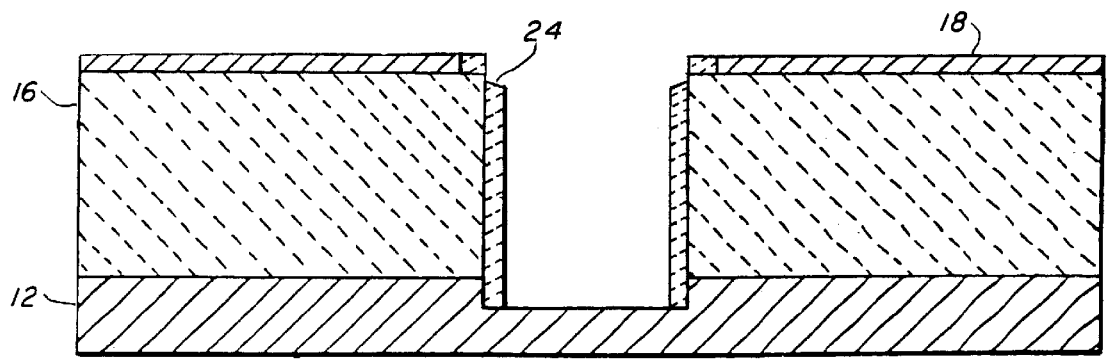
Figure 18:
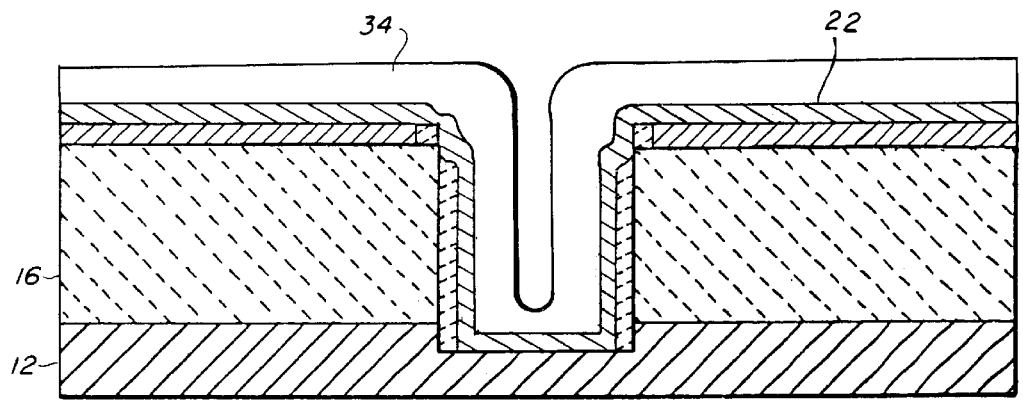
Figure 19:
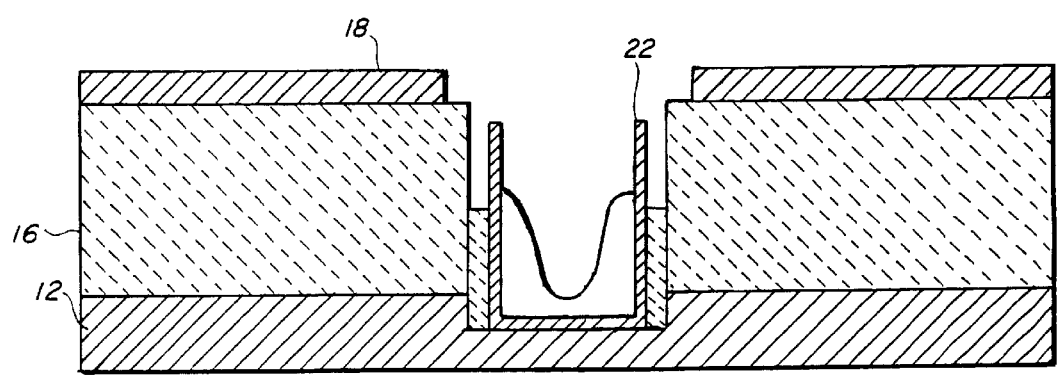
Figure 20:
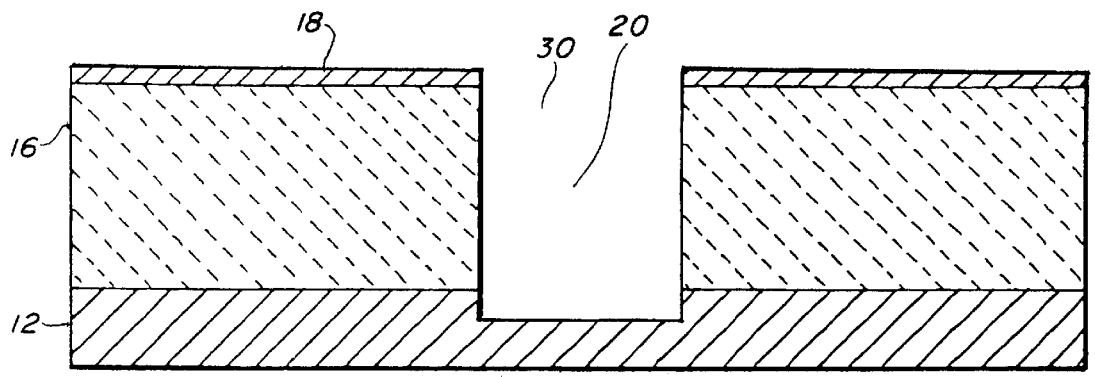
FIGS. 20 through 24 show the processing steps involved in fabricating a field emitter cell according to the present invention in which the gate layer aperture is coincident with the insulating layer aperture and in which a standoff layer is used to shield the gate layer from the emitter.
Figure 21:
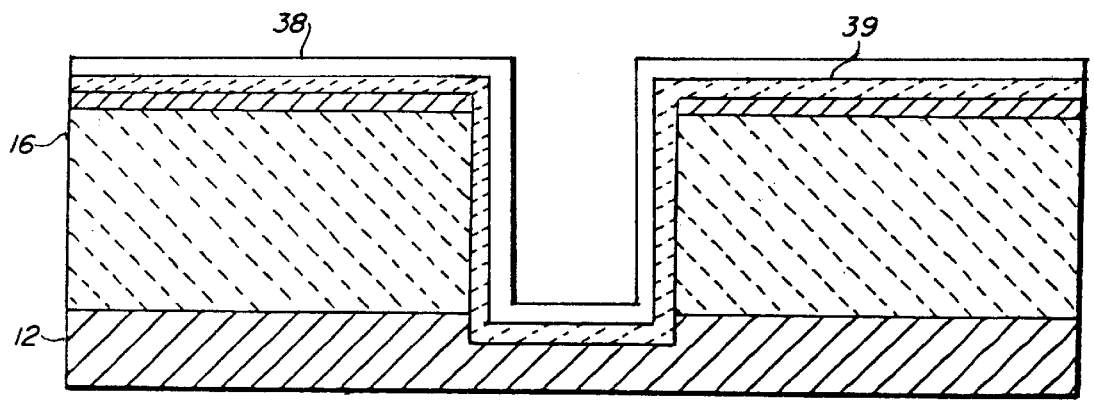

Alternatively, as shown in FIGS. 15–19, the gate material may be etchable by standard RIE methods, such materials including, but not limited to, silicon. If the gate material is etchable, a protection layer 36, such as a chrome layer, may be used to protect the gate from being tapered, as shown in FIGS. 15 and 16. The protection layer 36 may either overhang to be coincident with the perforation 20 in the insulating layer 16 or be coincident with the edge of the perforation 30 in the gate layer. If desired, the protection layer may be removed by wet etching or selective wet etching after the etching back of the standoff layer. As in FIGS. 10–14, the processing steps shown in FIGS. 15–19 are similar to those described in the previously mentioned embodiments, leading to a final emitter cell which has a nontapered, offset gate layer that can be made of a material etchable by standard RIE methods.

Figure 22:
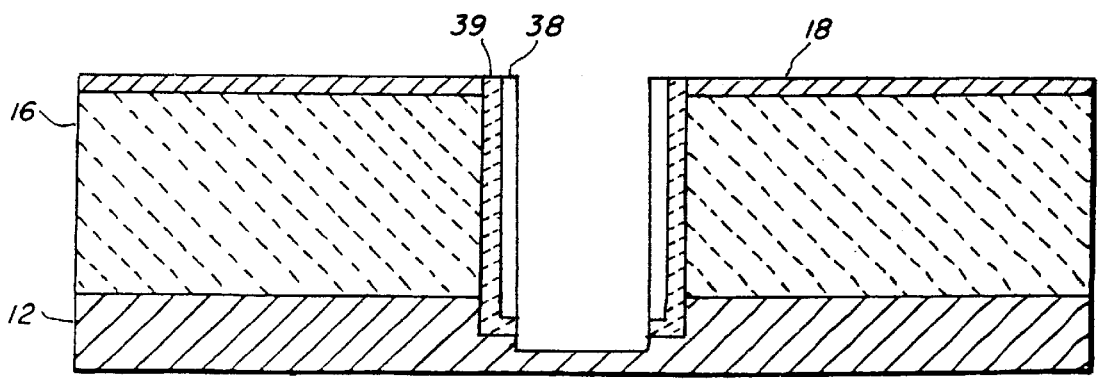
Figure 23:
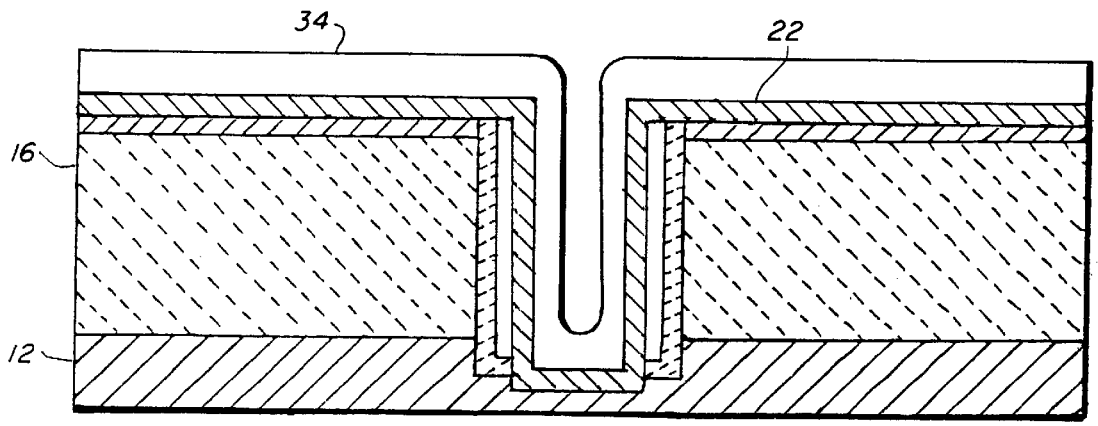
Figure 24:
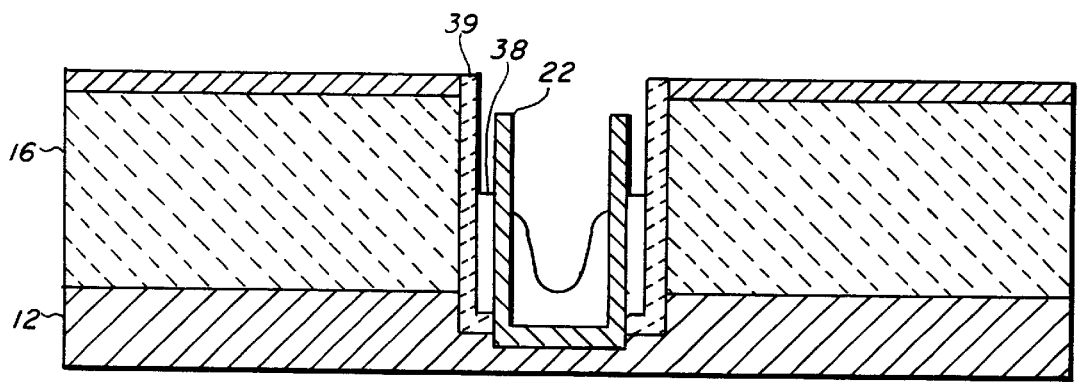

In yet another embodiment, FIGS. 20–24 show a gate layer 18 having a perforation 30 that is coincident with perforation 20 in the insulator layer 16. It is to be understood, however, that it is also within the scope of the present invention to alternatively provide a perforation in the gate layer that is either smaller or larger than the perforation in the insulator layer. Two standoff layers, 38 and 39, which can be made of different materials are deposited by any suitable method, e.g., CVD. In FIG. 22, both standoff layers are directionally etched back so that their vertical top ends are about the same height as the gate layer 18, with standoff layer 39 covering the edge of the perforation 30 in the gate layer. At this point, an enlargement of the depression at the bottom of the hole may be carried out as in the previously described embodiments to provide improved electrical contact between the emitter and the substrate, if desired. Then, as shown in FIG. 23, the emitter layer 22 and overlayer 34 are deposited by similar methods as in the previously described embodiments. After directional removal of the horizontal portions of the emitter layer 22 and overlayer 34, only the standoff layer 38 and the overlayer 34 are recessed back (without etching or altering standoff layer 39) to provide the final emitter cell as shown in FIG. 24. For example, standoff layer 39 can be made of silicon nitride, while standoff layer 38 can be made of CVD silicon dioxide. Standoff layer 39 therefore shields the edge of gate layer 18 from any direct line of sight from the emitter 22. Covering the exposed sharp edges of gate layer 18 can also potentially reduce the possibility of arcing.

Figure 28:
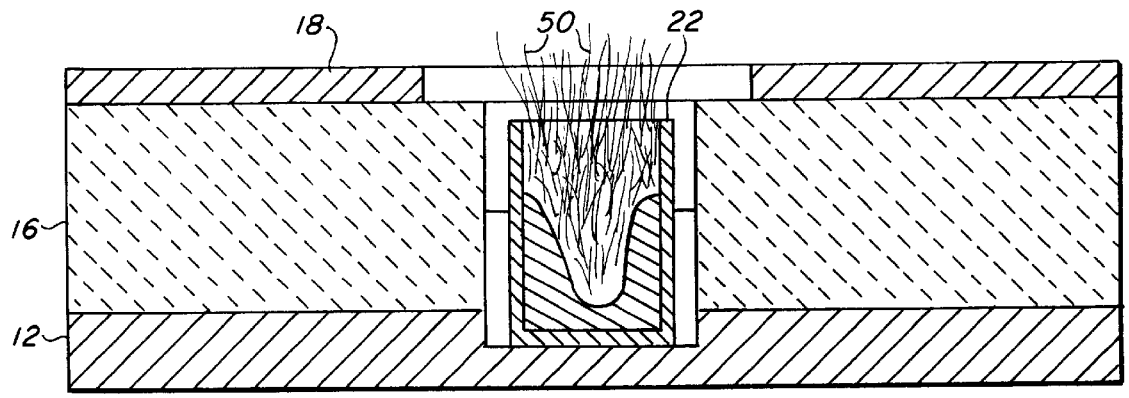
FIGS. 28 and 29 show the side (cross-sectional) and top views of a cell wherein the emitter layer incorporates nanofilaments without a capping (or sandwiching) conducting protection layer for the nanofilaments.
Figure 29:
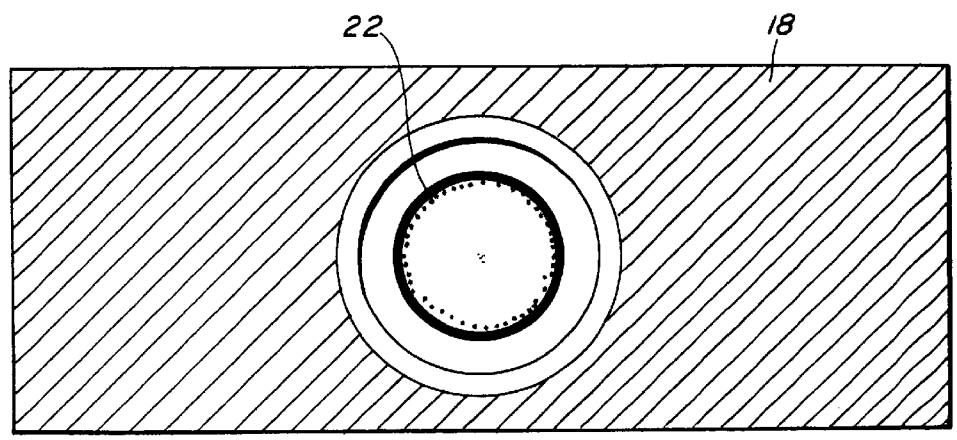
Figure 30:
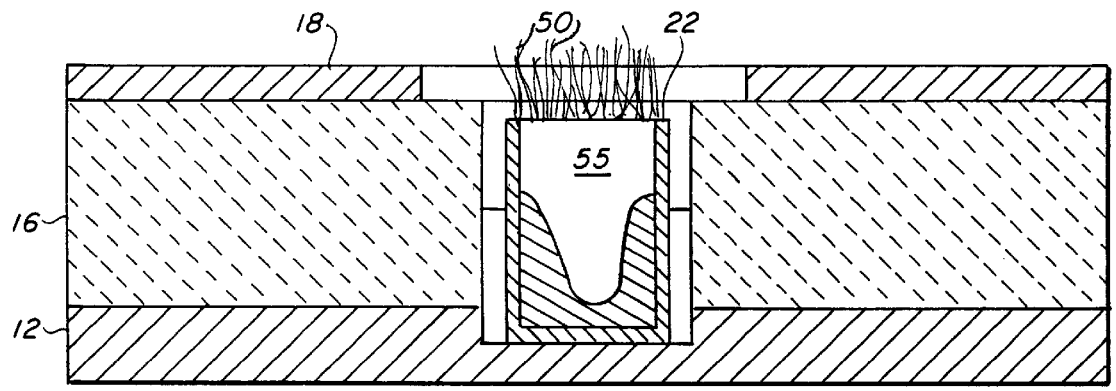
FIGS. 30 and 31 show the side (cross-sectional) and top views of a cell wherein the emitter layer incorporates nanofilaments with a capping (or sandwiching) conducting protection layer for the nanofilaments.
Figure 31:
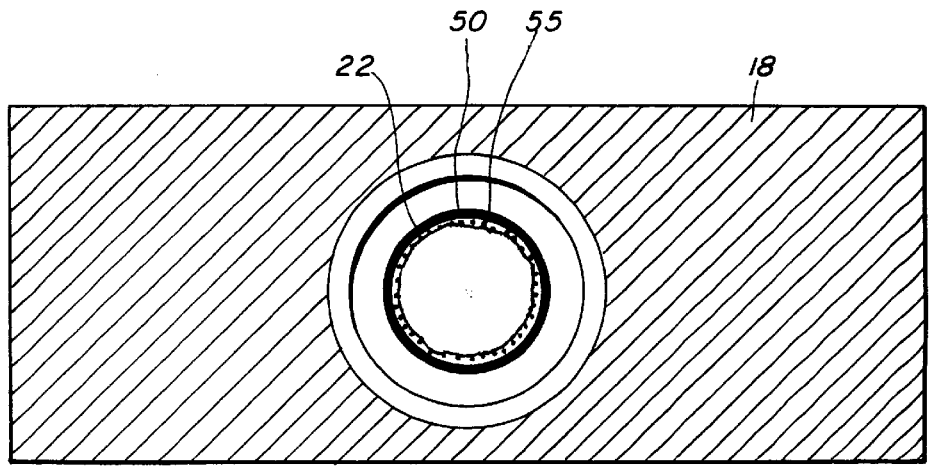

FIGS. 28–31 show the embodiments where nanofilaments 50 are included in the field emitter cell, with or without a conducting protection layer 55 as part of the emitter layer structure. Specifically, FIGS. 28 and 29 show the cross-sectional and top views of a cell without a capping (or sandwiching) conducting protection layer for the nanofilaments; FIGS. 30 and 31 show the cross-sectional and top views of a cell in which a capping (or sandwiching) conducting protection layer 55 is included. As mentioned previously, the conduction protection layer (e.g., Pt), which is optional, ensures good electrical and mechanical contacts between the nanofilaments and the emitter layer.

The fabrication processing steps for cells including nanofilaments are essentially the same as those for the other embodiments of the present invention up to the deposition of the emitter layer at which point the incorporation of the nanofilaments take place. A layer, preferably made of a noble metal (e.g., Pt, Au, or Au/Pd), is deposited as or on an existing emitter layer 22 (or the exposed layer of a multi-layer emitter structure), preferably conformally, so that the vertical sidewalls of the emitter layer are coated. The structure is then sputtered by an ion beam or reactive-ion-etched normal to the substrate in order to remove the emitter layer(s) from the top horizontal surface of the emitter cell.

The structure is then treated with a solution of, e.g. a long chain thiol such as octanedecanethiol which will selectively attach to the noble metal film left on the vertical sidewalls of the emitter layer, rendering it coated with a hydrophobic monolayer of alkanethiol. As described in M. Burghard et al., "Controlled Adsorption of Carbon Nanotubes on Chemically Modified Electrode Arrays," *Advanced Materials*, 10, pp. 584–587 (1998), which is incorporated herein by reference, nanofilaments (specifically carbon nanotubes) can be treated with a micellar surfactant such as sodium dodecylsulfate (SDS), which attach to the nanofilament in a shell, to provide negatively-charged end groups that project outward to the water phase, which end groups will preferentially attach to a hydrophobic (e.g., octadecanethiol-coated noble metal) surface. It should be noted that in a neutral or basic pH aqueous solution, silicon dioxide surfaces are negatively charged. According to Burghard et al., supra, SDS-coated carbon nanotubes are repelled by and would not attach to such negatively charged surfaces.

Therefore, by applying a suspension of the SDS-coated nanofilament in such a solution to the structure, the negatively charged SDS-coated nanofilaments selectively adhere to the hydrophobic alkanethiol-coated noble metal sidewalls of the emitter and is repelled by negatively charged surfaces (e.g., silicon layer gate with native oxide, CVD silicon dioxide standoff layer, and the exposed silicon dioxide insulator). By initially choosing nanofilaments having lengths of a sizable fraction of the diameter of the emitter film cylinder (e.g., 10–50%), the nanofilaments are likely to preferentially orient themselves parallel to the longitudinal walls of the emitter layer or have a significant vertical component in this orientation. The shorter nanofilaments (e.g., length/diameter ratios less than 0.2) are less likely to cause shorting of the gate. A careful rinse will remove the nanofilaments from the horizontal top surface of the emitter cell without removing them from the emitter layer sidewall. Optionally, to ensure that the carbon nanotubes are removed from the horizontal top surface, a directional oxygen RIE step can be carried out after etch-back of a protection layer such as CVD silicon dioxide which may be deposited to protect the nanotubes on the vertical sidewall of the emitter layer. Optionally, the CVD silicon dioxide protection layer may be stripped by dipping in HF. As described above, an optional conducting protection film such as an oxidation resistant metal (e.g., Pt) can be deposited preferably conformally on top of the resulting structure in order to provide better electrical contact and stronger mechanical anchoring. In addition, an optional low work function material such as Li can be deposited before the deposition of the protection layer. Further, an overlayer as in the other embodiments of the present invention can optionally be deposited before a second sputtering step. Finally, the structure can then again be ion beam sputtered normal to the substrate to remove the conducting protection film from the horizontal surface as well as to exposed fresh ends of upward oriented nanofilaments. Then the exposed vertical standoff layer, if present, can be recessed as in the other embodiments of the present invention.

Alternatively, instead of adhering the nanofilaments to the sidewalls of the emitter film, nanofilaments can be grown in situ on the sidewalls. In such an embodiment, however, the sidewalls of the emitter must be a catalytic metal such as Ni, Fe, and/or Co, which metals can be deposited by using suitable precursors such as metal carbonyls employing a CVD method. This is followed by removal of the catalytic metal from the top horizontal surface as before. A number of methods such as pyrolysis, plasma CVD, and arc discharge can be used to selectively grow nanofilaments, especially carbon nanotubes, on these catalytic metal surfaces. Any residual carbon impurities on the horizontal surfaces can be removed by using directional oxygen RIE.

Having described the invention, the following examples are given to illustrate specific applications of the invention including the best mode now known to perform the invention. These specific examples are not intended to limit the scope of the invention described in this application.

EXAMPLES

Example 1

Sample GSO4 (With Tapered Gate Layer)

A silicon (100) wafer was thermally oxidized to produce a 400 nm thick silicon dioxide layer (insulator layer) on top of the wafer. A 150 nm thick, heavily doped p-type amorphous silicon layer (gate layer) was deposited on top of the silicon dioxide. The wafer was then patterned by standard lithographic means and reactive ion etched (RIE) to produced holes with a diameter of about 630 nm and a depth of about 800 nm. The holes have essentially vertical sidewalls. The holes were configured in small linear arrays of 50 in 1×1 cm fields on the wafer. The wafer was cut into these 1×1 cm square pieces for processing.

On sample wafer GSO4, a 290 nm thick layer (measured on top surface of the sample) of silicon dioxide (standoff layer) was deposited by low pressure CVD. It was etched back completely by RIE and the RIE was continued to remove at least 20 nm of the substrate silicon at the bottom of the hole.

Adhesion and emitter layers were then deposited by chemical beam deposition (a very low pressure limit of CVD). The sample was heated to 430° C. in a high vacuum chamber and placed at 3 mm distance in front of a doser tube for Cr deposition with chromium carbonyl as the Cr precursor. A few hundred Angstroms of Cr was deposited. In the same run, a sandwich layer of Pt/Li/Pt was deposited at 297° C. by dosing with $4 \times 10^{-6}$ Torr of tetrakis-trifluorophosphine platinum, followed by t-butyl lithium, and again tetrakis-trifluorophosphine platinum, all in the presence of $1.0 \times 10^{-5}$ Torr of hydrogen, for durations of 22 min, 8 min, and 20 min, respectively.

An overlayer of silicon dioxide about 100 nm thick was then deposited on top of the emitter layer by low pressure CVD.

The sample was then sputtered with a 3-cm diameter argon ion beam at a beam energy of 400 eV, beam current of 10 mA, and beam angle normal to the substrate for 19 minutes to remove the silicon dioxide overlayer, the multi layer Pt/Li/Pt/Cr from the top horizontal surface. Then the sample was dipped in a 2.5% buffered HF solution for 18 seconds to recess the vertical portions of the silicon dioxide standoff layer and the overlayer.

Figure 25:
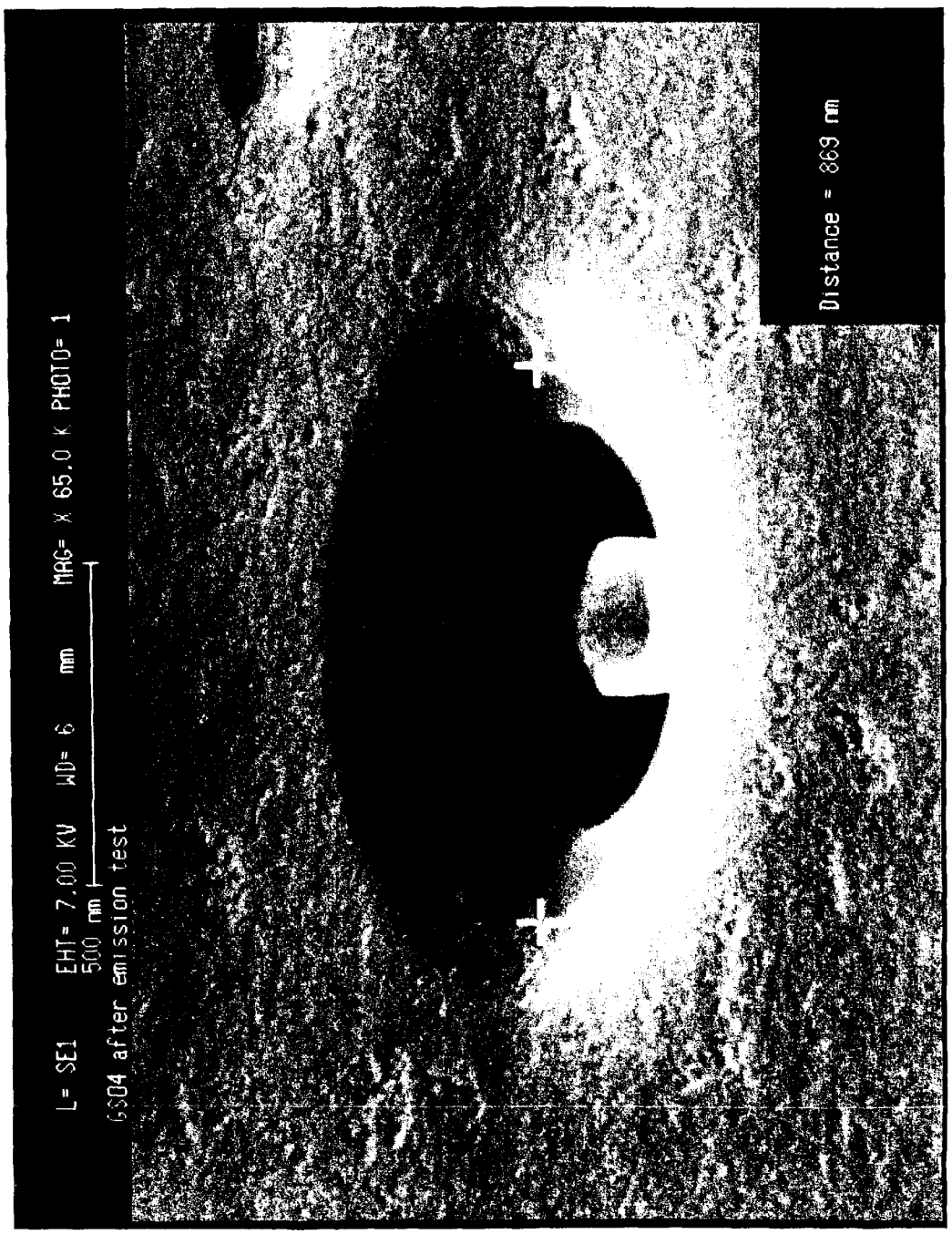
FIG. 25 is an electron micrograph of a field emitter cell having a tapered gate layer aperture.

SEM analysis of GSO4 revealed a field emitter cell (FIG. 25) having a hollow vertical cylindrical emitter (cathode) with cylinder wall thickness of about 30 nm and an outer diameter of about 250 nm, centered in a thermal silicon dioxide aperture with diameter of 630 nm, concentrically surrounded by a tapered gate (p-type amorphous silicon) with inner and outer diameters (starting and finish of the tapered region) of 870 nm and 1100 nm, respectively. The top edge of the emitter was below the top level of the thermal silicon dioxide aperture, so there was no direct line of sight to the gate.

Figure 26:
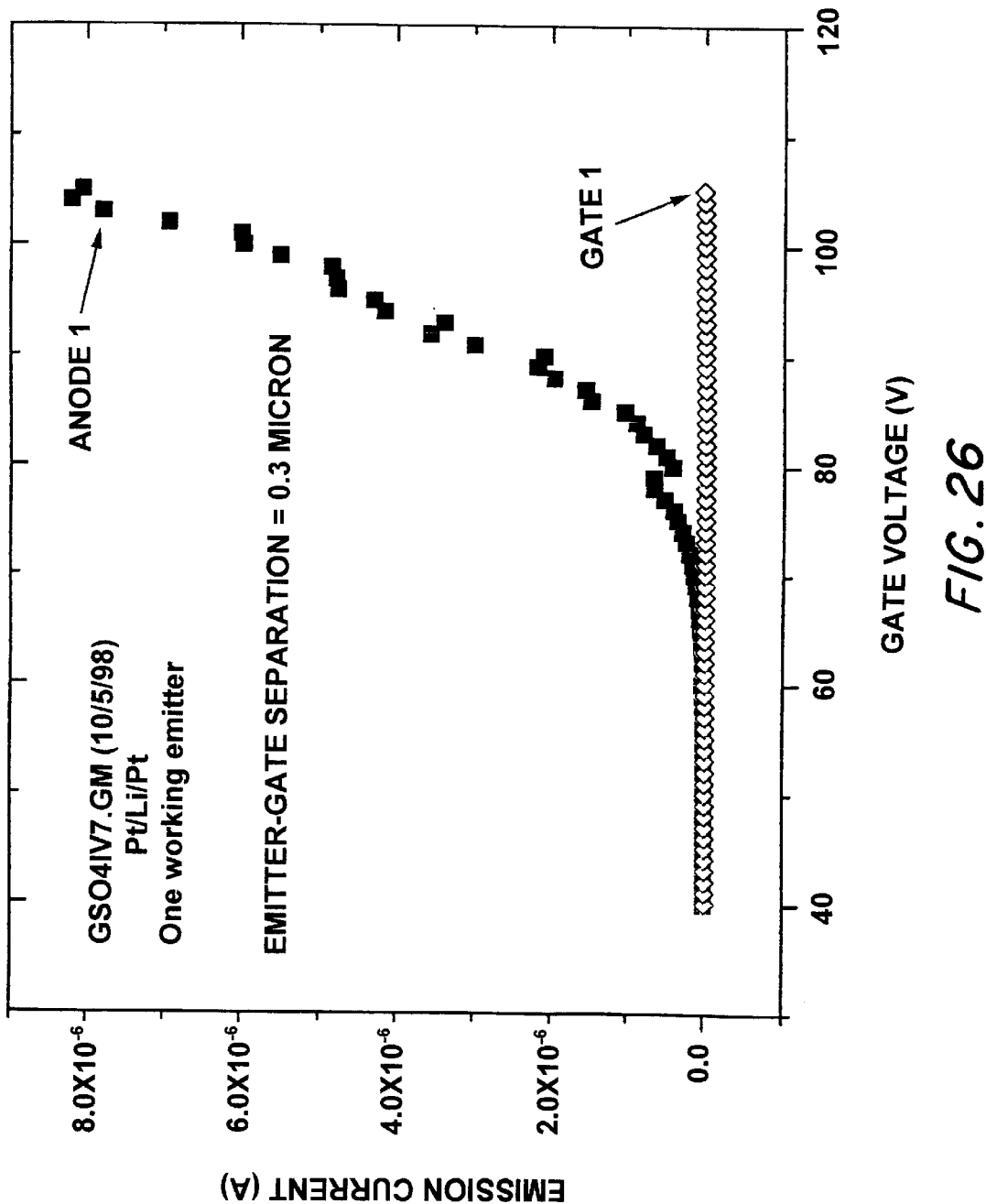
FIG. 26 is a graph showing the emission current versus gate voltage for a field emitter cell according to the present invention.

The sample was mounted in a emission test apparatus in a ultrahigh vacuum chamber with the sample 2 mm away from an anode plate. With the emitter (substrate) grounded through a 10 M-ohm series ballast resistor and the anode plate biased at +400V, a positive bias voltage was applied to the gate to extract emission. The resulting anode and gate currents (emission currents collected on the anode and the gate) versus gate voltage characteristics are shown in FIG. 26. The salient feature is the extremely low gate current (<0.2% of the anode current).

Example 2

Sample G3R (p-type Silicon Gate With Top Cr Protection Layer)

Figure 27:
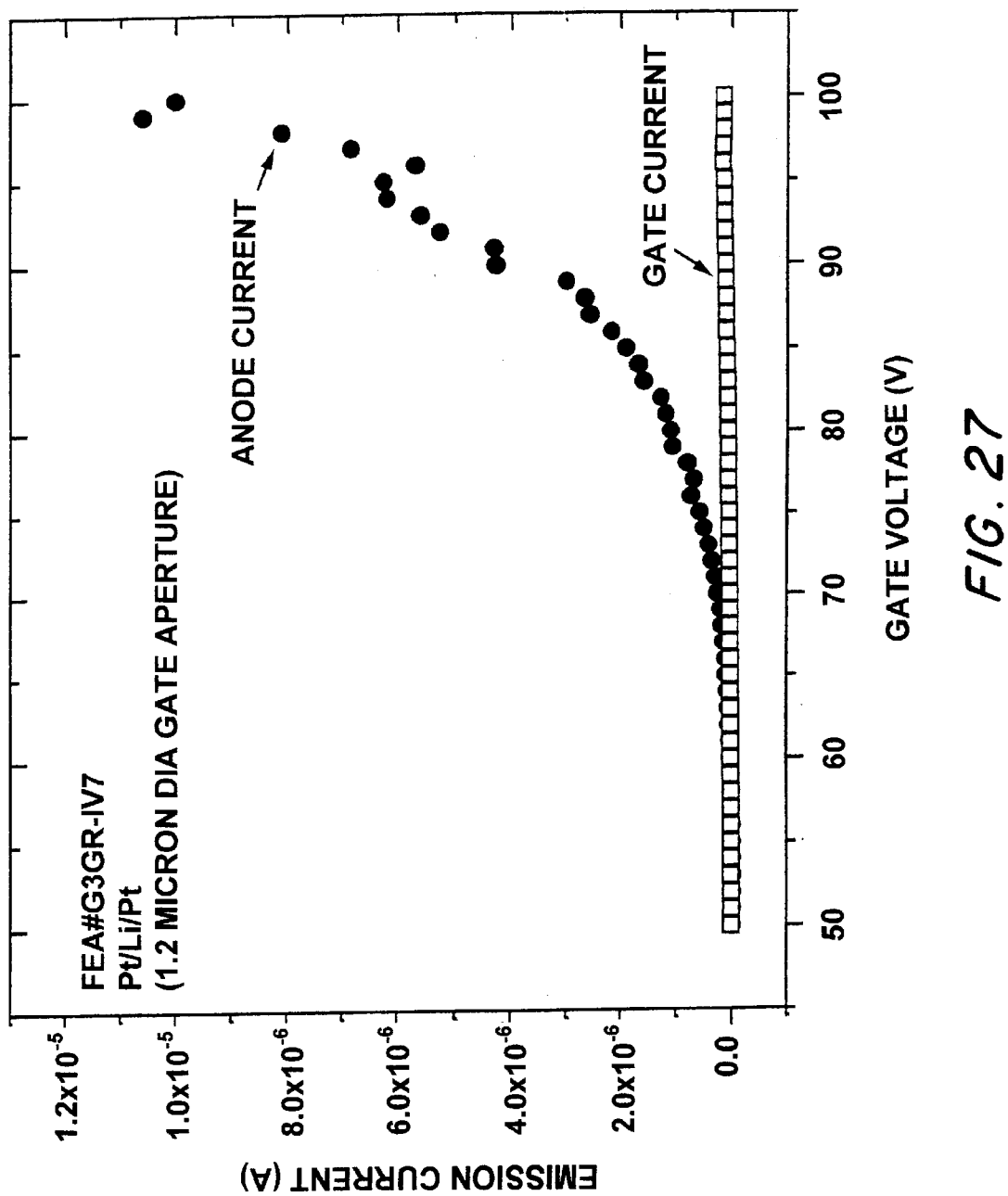
FIG. 27 is a graph showing the emission current versus gate voltage for yet another emitter cell according to the present invention.

The starting structure was similar to sample GSO4 in the first example, except that there was a 600 A thick Cr protection layer on top of the p-type silicon gate layer and that the hole diameter in the thermal silicon dioxide was about 1.2 microns. The edge of the p-type silicon gate near the hole opening was offset by about 150 nm by using isotropic dry etching. A standoff silicon dioxide layer 480 nm thick on the top surface was deposited using low pressure CVD. It was etched back using RIE and continued so that at least several hundred Angstroms of the substrate silicon is removed from the bottom of the hole. A further enlargement of the bottom silicon substrate area was carried out with selective isotropic etching to produce a larger contact surface area between the emitter and the substrate. Using similar chemical deposition procedures as in example #1, a sandwich emitter layer consisting of Pt/Li/Pt was deposited. For this sample, no overlayer was used. Ion beam sputtering using similar parameters removed the emitter layer from the top horizontal surface. Buffered HF dip was again used to recess the top portion of the exposed vertical standoff layer. Electron emission measurements were obtained in a similar manner as in Example 1. The applied anode voltage was +300V. The current-voltage characteristics are shown in FIG. 27 which shows a gate current less than 1% of the anode current.

What is claimed is:

1. A field emitter cell comprising:
an electrically conductive substrate layer;
an insulating layer directly upon said electrically conductive substrate layer, said insulating layer having a first perforation therethrough, said first perforation having an aperture, at least one essentially vertical sidewall and a bottom surface defined by said electrically conductive substrate layer;
an electrically conductive gate layer directly upon said insulating layer, said electrically conductive gate layer having a second perforation therein, said second perforation having an aperture larger than the aperture of said underlying first perforation; and
an electrically conductive thin film edge emitter, electrically insulated from said gate layer and in electrical contact with said substrate layer, said emitter extending upward from said substrate, said emitter having an upper electron-emitting edge in close proximity to said gate layer, said electrically conductive thin film edge emitter forming a shell having said upper electron-emitting edge as an open upper end of said shell.

2. The field emitter cell according to claim 1, wherein said substrate layer at the vicinity of the bottom of said first perforation comprises an enlarged cavity having lateral dimensions greater than the lateral dimensions of said first perforation.

3. The field emitter cell according to claim 1, wherein said second perforation defines a tapered aperture in said gate layer.

4. The field emitter cell according to claim 1, wherein said second perforation is defined by sidewalls that are parallel to said essentially vertical sidewall of said first perforation.

5. The field emitter cell according to claim 1, wherein said second perforation is concentric with said first perforation.

6. The field emitter cell according to claim 1, further comprising a standoff layer disposed between said insulating layer and said emitter.

7. The field emitter cell according to claim 6, wherein said standoff layer is recessed.

8. The field emitter cell according to claim 1, wherein a region of said insulating layer near the edge of said second perforation is negatively charged during emission.

9. The field emitter cell according to claim 1, wherein said field emitter cell exhibits a gate current of less than about 5% of the anode current.

10. The field emitter cell according to claim 9, wherein said field emitter cell exhibits a gate current of less than about 1% of the anode current.

11. The field emitter cell according to claim 1, wherein said emitter further comprises a protective outer layer selected from the group consisting of AlN, TiAlN, AlTiN, BN, TiN, SiN, SiC, diamond, and carbon having a structure similar to diamond.

12. The field emitter cell according to claim 1, wherein said emitter is made of carbon, silicon carbide, transition metal carbides, and transition metal nitrides.

13. The field emitter cell according to claim 12, wherein said emitter is made of doped diamond or of carbon having a structure similar to diamond.

14. The field emitter cell according to claim 1, further comprising nanofilaments on said emitter.

15. The field emitter cell according to claim 14, wherein said nanofilaments are carbon nanotubes.

16. The field emitter cell according to claim 1, further comprising an optional layer disposed between (a) said substrate layer and (b) said emitter and/or said insulating layer.

17. The field emitter cell according to claim 1, further comprising an overlayer disposed within said first perforation.

18. The field emitter cell according to claim 1, where in s aid gate layer is readily etchable by directional dry etching.

19. The field emit ter cell according to claim 1, wherein said gate layer is not readily etchable by directional dry etching.

20. The field emitter cell according to claim 1, wherein said gate layer comprises a p-type semiconductor material.

21. The field emitter cell according to claim 1, wherein said emitter is comprised of a catalytic metal; wherein said catalytic metal includes nanofilaments on said catalytic metal.

22. The field emitter cell according to claim 21, wherein said nanofilaments are carbon nanotubes.

23. A field emitter cell comprising:
an electrically conductive substrate layer;
an insulating layer directly upon said electrically conductive substrate layer, said insulating layer having a first perforation therethrough, said first perforation having at least one essentially vertical sidewall and a bottom surface defined by said electrically conductive substrate layer;
an electrically conductive gate layer directly upon said insulating layer, said electrically conductive layer having a second perforation therein, said second perforation being coincident with, or larger or smaller than, said underlying first perforation;

an electrically conductive thin film edge emitter, electrically insulated from said gate layer and in electrical contact with said substrate layer, said emitter extending upward from said substrate, said emitter having an upper electron-emitting edge in close proximity to said gate layer, said electrically conductive thin film edge emitter forming a shell having said upper electron-emitting edge as an open upper end of said shell; and a standoff insulator layer extending upward from within said first perforation and essentially parallel to said side walls, said standoff layer being disposed between said emitter and said side walls and having an upper portion that substantially shields said gate layer from said emitter so that there is no direct line of sight between said gate layer and said emitter.

24. The field emitter cell according to claim 23, wherein said substrate layer at the vicinity of the bottom of said first perforation comprises an enlarged cavity having lateral dimensions greater than the lateral dimensions of said first perforation.

25. A field emitter cell according to claim 23, further comprising an additional standoff layer between said emitter and said standoff insulator layer.

26. A field emitter cell according to claim 25, wherein said additional standoff layer extends upward within said first perforation to less than the height of said emitter.

27. A field emitter cell according to claim 23, further comprising nanofilaments on said emitter.

28. The field emitter cell according to claim 27, wherein said nanofilaments are carbon nanotubes.

29. A field emitter cell comprising:

an electrically conductive substrate layer;

an insulating layer directly upon said electrically conductive substrate layer, said insulating layer having a first perforation therethrough, said first perforation having an aperture, at least one essentially vertical sidewall and a bottom surface defined by said electrically conductive substrate layer;

an electrically conductive gate layer directly upon said insulating layer, said electrically conductive gate layer having a second perforation therein; and an electrically conductive thin film edge emitter, electrically insulated from said gate layer and in electrical contact with said substrate layer, said emitter extending upward from said substrate, said emitter having an upper electron-emitting edge in close proximity to said gate layer, said electrically conductive thin film edge emitter forming a shell having said upper electron-emitting edge as an open upper end of said shell;

wherein said field emitter cell is configured so that said gate layer is substantially shielded from a direct line of sight from said emitter.

30. The field emitter cell according to claim 29, wherein said substrate layer at the vicinity of the bottom of said first perforation comprises an enlarged cavity having lateral dimensions greater than the lateral dimensions of said first perforation.

31. A field emitter cell according to claim 29, further comprising nanofilaments on said emitter.

32. The field emitter cell according to claim 31, wherein said nanofilaments are carbon nanotubes.

33. A field emitter cell comprising:

an electrically conductive substrate layer;

an insulating layer directly upon said electrically conductive substrate layer, said insulating layer having a first perforation therethrough, said first perforation having at least one essentially vertical sidewall and a bottom surface defined by said electrically conductive substrate layer;

an electrically conductive gate layer directly upon said insulating layer, said electrically conductive layer having a second perforation therein, said second perforation being coincident with, or larger or smaller than, said underlying first perforation;

an electrically conductive thin film edge emitter, electrically insulated from said gate layer and in electrical contact with said substrate layer, said emitter extending upward from said substrate, said emitter having an upper electron-emitting edge in close proximity to said gate layer, said electrically conductive thin film edge emitter forming a shell having said upper electron-emitting edge as an open upper end of said shell; and a standoff insulator layer extending upward from within said first perforation and essentially parallel to said side walls, said standoff layer being disposed between said emitter and said side walls and having an upper portion that substantially shields said gate layer from said emitter so that said emitter is electrically isolated from said gate layer.

* * * * *